US008898402B1

(12) United States Patent
Stronge

(10) Patent No.: US 8,898,402 B1
(45) Date of Patent: Nov. 25, 2014

(54) ASSIGNING STORAGE RESOURCES IN A VIRTUALIZATION ENVIRONMENT

(75) Inventor: William Stronge, Westford, MA (US)

(73) Assignee: EMC Corporation, Hopkinton, MA (US)

(*) Notice: Subject to any disclaimer, the term of this patent is extended or adjusted under 35 U.S.C. 154(b) by 875 days.

(21) Appl. No.: 13/065,849

(22) Filed: Mar. 31, 2011

(51) Int. Cl.
G06F 12/00 (2006.01)
G06F 13/00 (2006.01)

(52) U.S. Cl.
USPC ........................................ 711/154; 711/100

(58) Field of Classification Search
CPC ...... G06F 12/00; G06F 12/02; G06F 12/0646
USPC ................................................. 711/100, 154
See application file for complete search history.

(56) References Cited

U.S. PATENT DOCUMENTS

| | | | |
|---|---|---|---|
| 5,742,792 A | 4/1998 | Yanai et al. | |
| 7,412,492 B1 | 8/2008 | Waldspurger | |
| 7,433,951 B1 | 10/2008 | Waldspurger | |
| 7,577,722 B1 | 8/2009 | Khandekar et al. | |
| 7,822,939 B1 | 10/2010 | Veprinsky et al. | |
| 7,836,018 B2 | 11/2010 | Oliveira et al. | |
| 7,885,276 B1 | 2/2011 | Lin | |
| 7,904,652 B1 | 3/2011 | Castelli et al. | |
| 8,244,956 B2* | 8/2012 | Laor et al. ........................ | 711/6 |
| 8,299,944 B2* | 10/2012 | Provenzano .................... | 341/50 |
| 2006/0069887 A1 | 3/2006 | LeCrone et al. | |
| 2008/0126547 A1 | 5/2008 | Waldspurger | |
| 2008/0163234 A1 | 7/2008 | Stronge et al. | |
| 2009/0070541 A1 | 3/2009 | Yochai | |
| 2010/0299495 A1* | 11/2010 | Frank ............................. | 711/170 |
| 2011/0131443 A1* | 6/2011 | Laor et al. .................... | 714/5.11 |

OTHER PUBLICATIONS

U.S. Appl. No. 11/823,152, filed Jun. 27, 2007, Burke.
U.S. Appl. No. 12/653,981, filed Dec. 18, 2009, Gong et al.
U.S. Appl. No. 12/924,388, filed Sep. 27, 2010, Balcha et al.
U.S. Appl. No. 12/924,474, filed Sep. 28, 2010, Fradkin et al.
U.S. Appl. No. 12/932,080, filed Feb. 17, 2011, Meiri et al.
J. Matthews et al., "Virtual Machine Contracts for Datacenter and Cloud Computing Environments," *ACDC '09*, Jun. 19, 2009, Barcelona, Spain, 6 pp.
"VMware Virtual Machine File System: Technical Overview and Best Practices," VMware Technical White Paper, Version 1.0, WP-022-PRD-01-01, 2007, 19 pp.
"EMC Symmetrix Virtual Provisioning, Applied Technology," EMC Corporation, White paper, Jun. 2008, 12 pp.

(Continued)

*Primary Examiner* — Tuan Thai
(74) *Attorney, Agent, or Firm* — Muirhead and Saturnelli, LLC

(57) ABSTRACT

A storage pool manager (SPM) simplifies the provisioning of storage in virtualized environments (VEs). The SPM pushes the provisioning of storage from a storage administrator out to virtualization users and administrators. By de-centralizing storage administration, storage provisioning is made as dynamic as server provisioning in a virtualization environment. Use of the SPM enables virtualization users to select storage for provisioning based on selection of a type of storage and an amount without having to be knowledgeable about storage provisioning operations. Details of creating the storage and performing masking operations to the servers are done automatically. Using a virtual container, the storage administrator is able to control the storage that is accessible to virtualization users for provisioning and is able to set boundaries and policies around what storage the virtualization users can provision from. Additionally, the virtualization administrator is allowed to sub-divide the storage made accessible from the storage administrator.

17 Claims, 12 Drawing Sheets

(56) References Cited

OTHER PUBLICATIONS

"Implementing Virtual Provisioning on EMC Symmetrix DMX with VMware Virtual Infrastructure," EMC Corporation, White paper, 2008, 30 pp.

"VMware vSphere, the First Cloud Operating System, Provides an Evolutionary, Non-disruptive Path to Cloud Computing," VMware White Paper, 2009, 8 pp.

"EMC Celerra Manager Makes Customizing Storage Pool Layouts Easy, Applied Technology," EMC White Paper, Jun. 2010, 17 pp.

* cited by examiner

ASSIGNING STORAGE RESOURCES IN A VIRTUALIZATION ENVIRONMENT

TECHNICAL FIELD

This application relates to the field of computer networks, and more particularly to the field of assigning and provisioning resources in a computer environment.

BACKGROUND OF THE INVENTION

In a virtualization environment, hosts use virtual switches to join clients (or tenants) in a network fabric local to a server. Uplink ports on the switch may be connected to other virtual fabrics or to a real LAN through the host's physical network card. Co-locating diverse clients in a virtualization environment requires a significant degree of resource isolation. Clients of one virtual machine should not be able to access CPU processes, stored data, or the network traffic of another. Techniques, such as assigning unique virtual local area network (VLAN) IDs, may be used to insure that traffic belonging to each unique client is sufficiently isolated. Virtual switches automatically tag traffic from a particular client, transparently providing data isolation from other clients.

Tenancies in a virtualization environment may require dynamic allocation, termination and/or modification (increasing or decreasing capacity) according to requirements of the clients. This can make network management a difficult and costly proposition as known virtual machine provisioning processes for given tasks may be resource intensive and require significant human involvement and configuration. In particular, it may difficult to optimize resource allocation to meet the different requirements of multiple clients. Furthermore, additional inefficiencies and/or disadvantages may occur as a result of the administrator for the provisioning and assigning of resources being different from an administrator for the virtualization environment, and users thereof, who may be unfamiliar with the requirements for resource provisioning.

Accordingly, it would be desirable to provide a system that allows for the improved assigning and provisioning resources, including storage resources, in a virtualization environment.

SUMMARY OF THE INVENTION

According to the system described herein, a method for managing storage in a virtualization environment includes identifying a storage pool having at least a first storage type in a storage array. A storage pool manager is provided that manages provisioning of storage corresponding to the storage pool according to a request. Access to the storage corresponding to the storage pool is controlled, in which access to the storage corresponding to the storage pool is controlled using a virtual container which is administrated separately from the provisioning of the storage. The request may correspond to provisioning of at least one virtual machine and includes a requested storage type and an amount of requested storage. The virtual container may include the storage corresponding to the storage pool, and the virtual container may be assigned to a virtual center used in connection with the provisioning of the storage. The provisioning of the storage according to the request may be performed using the storage pool manager that is accessed by a user via a user interface. The user interface may be provided using a browser plug-in. The storage pool may be a thin pool and/or other appropriate kind of storage pool. A storage administrator may assign the storage corresponding to the storage pool to the virtual container, and a virtualization entity, that is an entity separate from the storage administrator, may provision storage according to the request from the virtual container.

According further to the system described herein, a non-transitory computer readable medium stores software for managing storage in a virtualization environment. The software includes executable code that identifies a storage pool having at least a first storage type in a storage array. Executable code is provided that provides a storage pool manager that manages provisioning of storage corresponding to the storage pool according to a request. Executable code is provided that controls access to the storage corresponding to the storage pool, in which access to the storage corresponding to the storage pool is controlled using a virtual container which is administrated separately from the provisioning of the storage. the request corresponds to provisioning of at least one virtual machine and includes a requested storage type and an amount of requested storage. The request may correspond to provisioning of at least one virtual machine and includes a requested storage type and an amount of requested storage. The virtual container may include the storage corresponding to the storage pool, and the virtual container may be assigned to a virtual center used in connection with the provisioning of the storage. The provisioning of the storage according to the request may be performed using the storage pool manager that is accessed by a user via a user interface. The user interface may be provided using a plug-in. The storage pool may be a thin pool and/or other appropriate kind of storage pool. Executable may be provided that enables a storage administrator to assign the storage corresponding to the storage pool to the virtual container. Executable may be provided that enables a virtualization entity, that is an entity separate from the storage administrator, to provision storage according to the request from the virtual container.

According further to the system described herein, a storage system includes a storage array and at least one storage server coupled to the storage array. At least one server provides functions of a storage pool manager. The functions of the storage pool manager include: identifying a storage pool having at least a first storage type in the storage array; providing a storage pool manager that manages provisioning of storage corresponding to the storage pool according to a request; and controlling access to the storage corresponding to the storage pool, in which access to the storage corresponding to the storage pool is controlled using a virtual container which is administrated separately from the provisioning of the storage. The request may correspond to provisioning of at least one virtual machine and includes a requested storage type and an amount of requested storage. The virtual container may include the storage corresponding to the storage pool, and the virtual container may be assigned to a virtual center used in connection with the provisioning of the storage. A storage administrator may assign the storage corresponding to the storage pool to the virtual container, and a virtualization entity, that is an entity separate from the storage administrator, may provision storage according to the request from the virtual container. The provisioning of the storage according to the request may be performed using the storage pool manager that is accessed by a user via a user interface. The storage pool may be a thin pool and/or other appropriate kind of storage pool.

BRIEF DESCRIPTION OF THE DRAWINGS

Embodiments of the system are described with reference to the several figures of the drawings which are briefly described as follows.

DETAILED DESCRIPTION OF VARIOUS EMBODIMENTS

Figure 1:
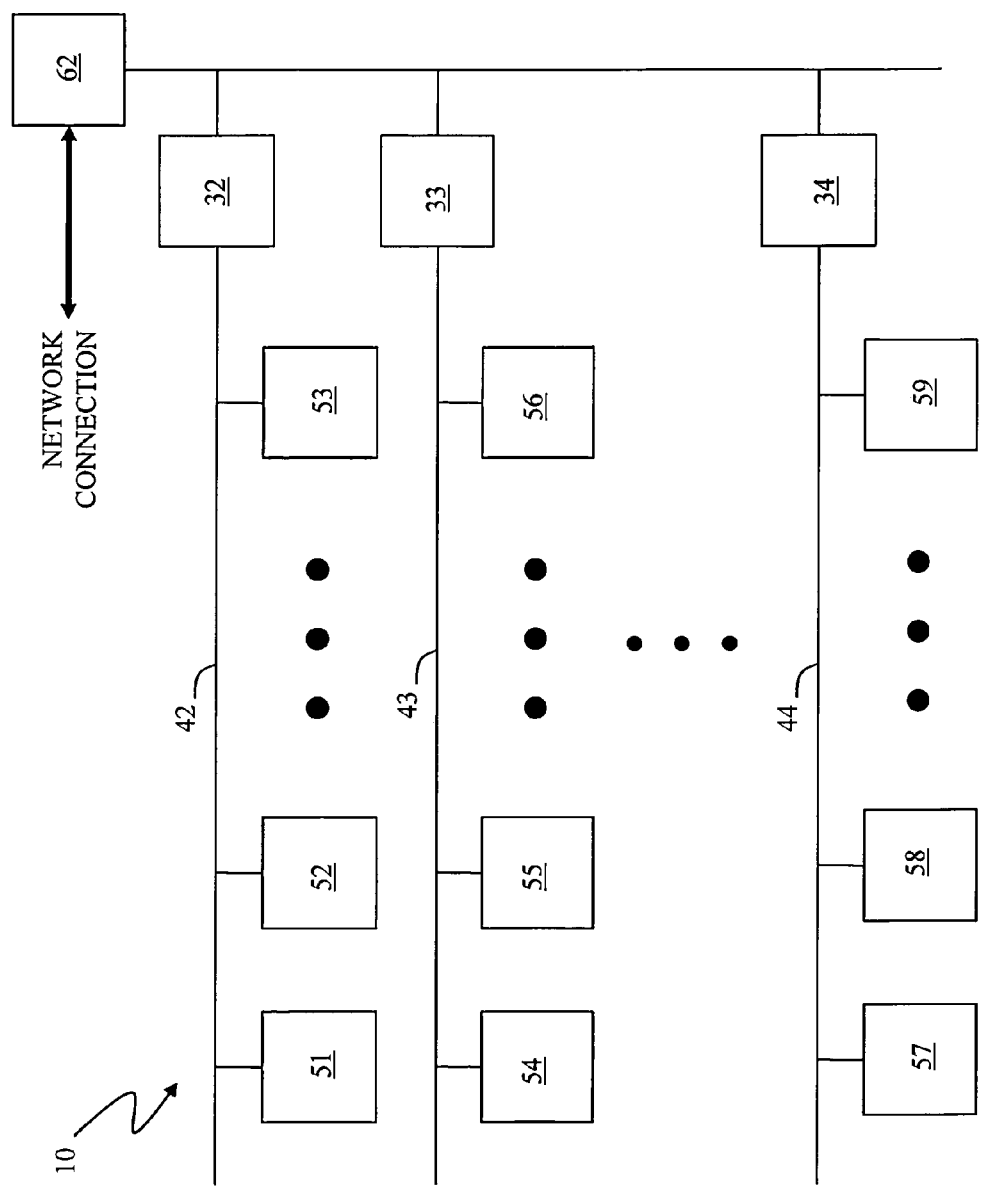
FIG. 1 is a schematic illustration of a server system that includes a plurality of routers, each of which may be used to interconnect a plurality of subnets that may be used in connection with an embodiment of the system described herein.

FIG. 1 is a schematic illustration of a server system 10 that includes a plurality of routers 32-34, each of which may be used to interconnect a plurality of subnets 42-44 that may be used in connection with an embodiment of the system described herein. Each of the subnets 42-44 may include a subset of a plurality of servers 51-59. The servers 51-59 may communicate using any of a number of appropriate protocols, such as TCP/IP. Each of the servers 51-59 may be provided with a private IP address (e.g., 192.168.X.X) or a public IP address. The routers 32-34 manage data communications to and from the servers 51-59.

The server system 10 may include at least one other additional router 62 that manages data communication between the server system 10 and a network, such as the Internet and/or another network or location. Note that it is possible to eliminate the router 62 altogether and have one or more of the other routers 32-34 manage communication to and from the server system 30. In an embodiment herein, the router 62 also provides appropriate security services, such as firewall protection.

Note also that, although each of the subnets 42-44 is shown as having three servers, the number of servers coupled to a subnet may be any number, possibly limited only by the physical address space of the subnet. In addition, there may be any number of subnets and, in some instances, the topology of the server system 10 may be different than that shown. Generally, a server system should be understood as including any system having a plurality of separately addressable servers that may be externally accessible (e.g., through the Internet and/or other network).

Using virtualization software, one or more of the servers 51-59 may be subdivided into a plurality of virtual machines. A virtual machine (VM) is a software implementation of a machine that executes programs like a physical machine. Virtualization software allows multiple virtual machines with separate operating systems, to run in isolation on the same physical machine. Each virtual machine may have its own set of virtual hardware (e.g., RAM, CPU, NIC, etc.) upon which an operating system and applications are loaded. The operating system sees a consistent, normalized set of hardware regardless of the actual physical hardware components. The term "virtualization software" is used herein to generally refer to any and all software that supports the operation of one or more virtual machines. A number of virtualization software products exist, including the VMware product family provided by EMC Corporation of Hopkinton, Mass. A benefit of providing virtual machines is the ability to host multiple, unrelated, tenants (users) in a single physical server. For example, three unrelated clients, each hosting their own Web site, may all reside on a single one of the servers 51-59 that is running virtualization software to present what looks like a single stand-alone server to each of the clients as well as other visitors to the Web sites. The virtualization software may maintain separation of each of the clients, which each separately access their own virtual server(s).

Operations of virtual machine may include using virtual machines images. A virtual machine image is a file containing a program that may be loaded and executed by a virtual machine and may include additional information used in connection with executing the program. A virtual machine image may be obtained for an operating virtual machine and transferred to another location where another virtual machine may use the virtual machine image to continue execution of the program from the state defined by the virtual machine image. In this way, the virtual machine image may be a snapshot of an execution state of a program by a virtual machine that may be moved between different locations and processing thereafter continued without interruption.

Configuring and deploying virtual machines is known in the field of computer science. For example, U.S. Pat. No. 7,577,722 to Khandekar, et al., entitled "Provisioning of Computer Systems Using Virtual Machines," which is incorporated herein by reference, discloses techniques for configuring and deploying a virtual machine according to user specifications. Virtual machines may be provisioned with respect to any appropriate computing resource, including, for example, CPU processing resources and/or memory.

In a virtualization environment, a virtual center, that may be referred to as a vCenter, may provide a central point of control for managing, monitoring, provisioning and migrating virtual machines, as further discussed elsewhere herein. The virtual center provides for managing virtual machines to be deployed and may perform virtual machine lifecycle management tasks, administer users and roles, and view usage metrics, among other functionality. Virtual centers may operate to control virtual machines in data centers and in connection with cloud computing including using both internal and external cloud infrastructures and hybrids thereof.

Figure 2:
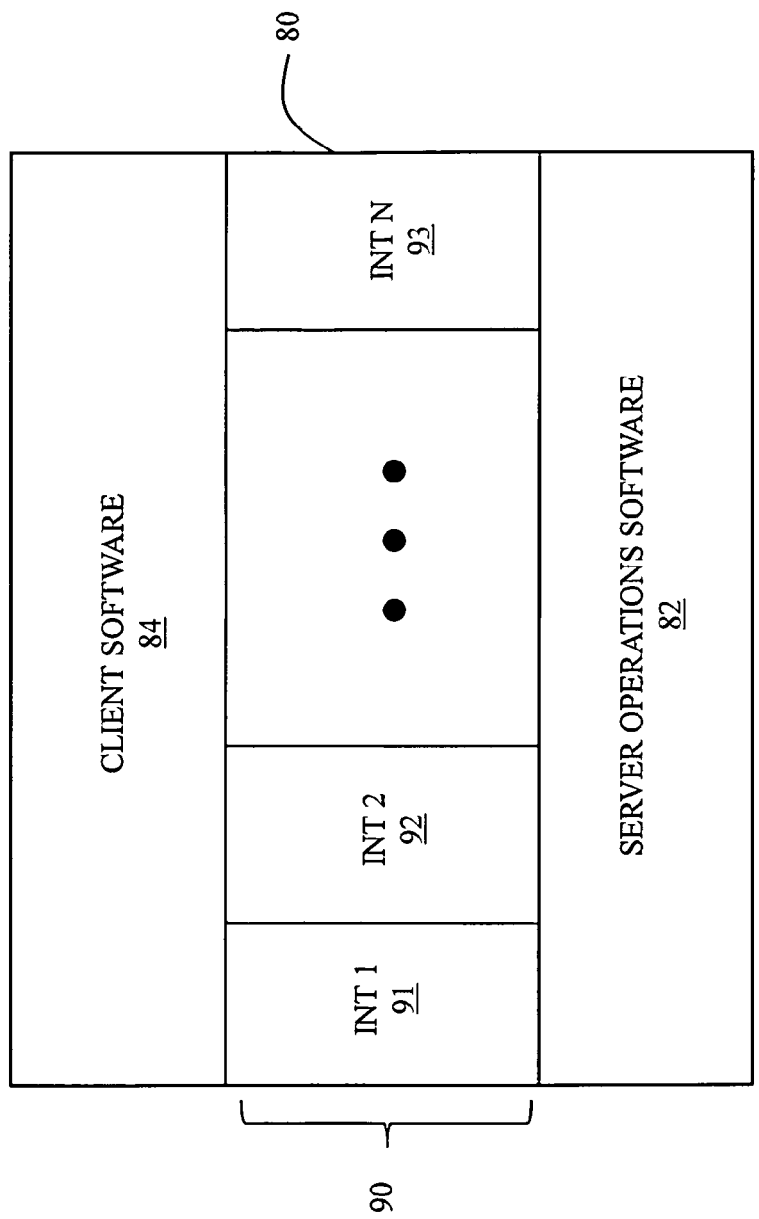
FIG. 2 is a schematic illustration showing a client that may be a cloud-computing client for which cloud computing resources may be provisioned according to embodiments of the system described herein.

FIG. 2 is a schematic illustration showing a client 80 that may be a cloud-computing client for which resources may be provisioned according to embodiments of the system described herein. The client 80 may include server operations software 82, client software 84, and an interface layer 90 that includes a plurality of interfaces 91-93 between the server operations software 82 and the client software 84. The server operations software 82 facilitates the exchange of information/data between the client 80 and the servers 51-59 to provide the functionality described herein. The client software 84 may represent any software that may be run on the client 80, including application software, operating system software, Web server software, etc., that is not part of the server operations software 82 or the interface layer 90. It is possible to have the client software 84 interact with the servers 51-59 through different ones of the interfaces 91-93 at the same time. Virtualization software, as discussed elsewhere herein, may be provided as part of the interface layer 90 and/or the server operations software 82. The client 80, and software thereof, may operate in connection with accessing web services for on-demand processing, such as computing and storage functions, in cloud environments and including the provisioning of resources, as further discussed elsewhere herein. In an embodiment, the client 80 may be a vSphere client from VMware, Inc. in Palo Alto, Calif., as further discussed elsewhere herein.

Virtual machines may be grouped into groups having similar configurations. Usage of resources of the different groups may be tracked. Virtual machine usage metrics may be measured according to the system described herein and may include meter usage of CPU (e.g., in GHz-hours), memory (e.g., in GB-hours) and/or virtual machine image storage (e.g., in GB-days), among others. Data for current usage and/or historical usage may be accessed using a management console. The management console may provide a graphical tool for managing a virtual compute environment allow: browsing the compute service environment to view details of an a virtual center, a data center, the state of deployed virtual machines, networks, and tasks; manage the lifecycle of virtual machines from upload to deployment, and power on/off, suspend and clone; assign the compute service admin role to users so that the users can access the compute service; view system metrics for resource usage including storage, CPU, and memory; and enable access to other online services, such as a storage service. Other service tools that may be provided in connection with operation of the system described herein may include a command line interface that lets a user prepare virtual management image files for upload to a data center. Further, an application programming interface (API) may be provided that lets a user perform management and administration actions on the data center and the virtual machines. Other software tools may be used in connection with the system described herein.

A service level agreement (SLA) may include various customer requirements and service provider objectives in connection with providing services, such as cloud computing services. For example, the SLA may indicate how many virtual machines a customer estimates would be required over certain time periods, for example, on a hourly, daily, weekly basis, etc. In other embodiments, the SLA may indicate processing performance requirements (for example processing requirements measured in GHz-hours), network performance requirements and/or storage requirements, among any other suitable requirements set forth in the SLA. The SLA may be stored in a computer-readable format in which requirements of the SLA may be harvested for use in connection with the system described herein. The SLAs may be stored on and/or accessible by the servers 51-59 and/or the client 80. The properties of virtual machines allow users' provisioned virtual machines to be migrated between different servers as needed and, accordingly, may be grouped according to particular configurations and requirements as further discussed elsewhere herein. It may be noted that although the system described herein is described principally in connection with the use of virtual machines, and processes corresponding thereto, it may be understood that other types of processing resources may also be used in connection with the system and techniques described herein.

Figure 3:
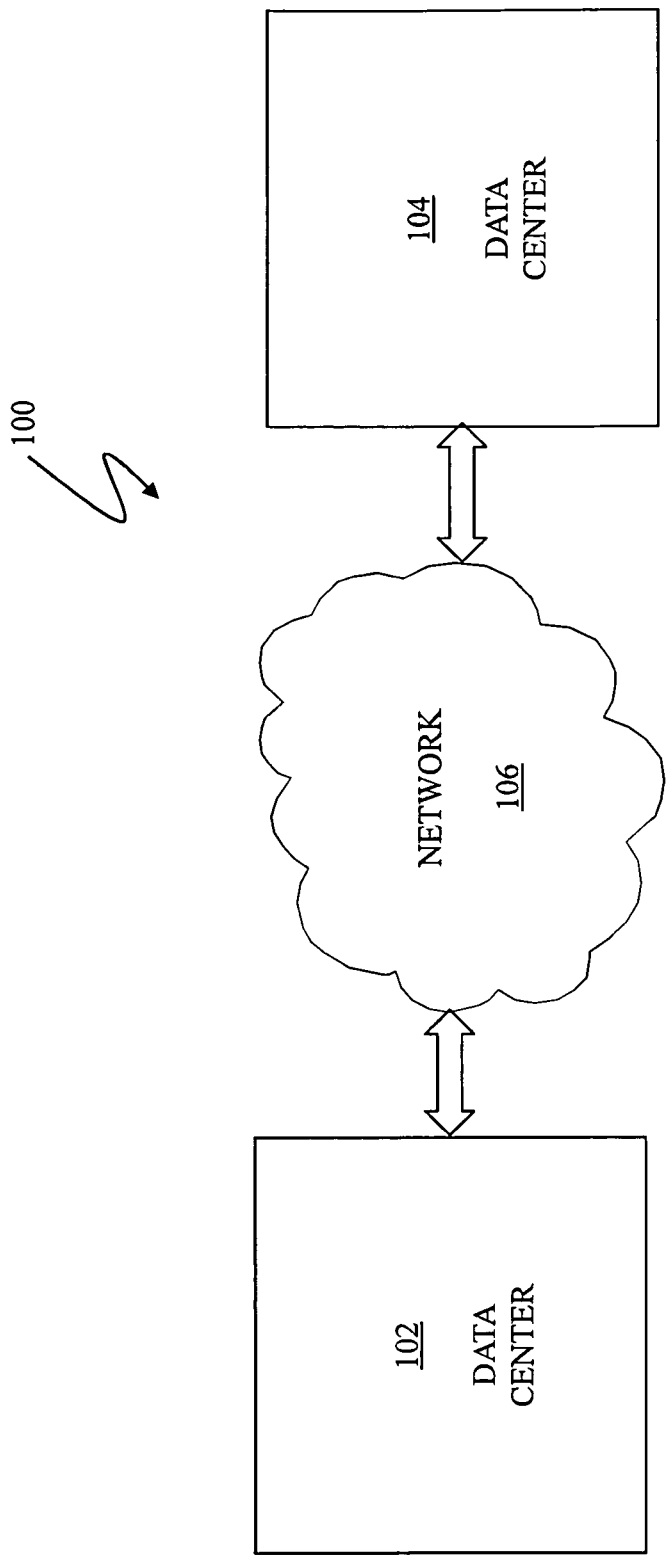
FIG. 3 is a schematic illustration showing a system that includes a first data center in communication with a second data center via a network.

FIG. 3 is a schematic illustration showing a system 100 that includes a first data center 102 in communication with a second data center 104 via a network 106. Each of the data centers 102, 104 may include a plurality of storage devices and processors (not shown in FIG. 3) for executing applications using a plurality of virtual machines (VMs). The VMs may be configured using any appropriate server virtualization technology, such as that provided by VMware, Inc. of Palo Alto, Calif., including vSphere. VSphere is a suite of tools offering the ability to perform cloud computing utilizing enterprise-level virtualization products such as VMware's ESX and/or ESXi. Other VM technology may be used, including conventional VM technology provided by other vendors.

The data centers 102, 104 may contain any number of processors and storage devices that are configured to provide the functionality described herein. In an embodiment herein, the storage devices may be Symmetrix storage arrays provided by EMC Corporation of Hopkinton, Mass. Other appropriate types of storage devices and different types of processing devices may also be used in connection with the system described herein. The data centers 102, 104 may be configured similarly to each other or may be configured differently. The network 106 may be any network or similar mechanism allowing data communication between the data centers 102, 104. In an embodiment herein, the network 106 may be the Internet and/or any other appropriate network and each of the data centers 102, 104 may be coupled thereto using any appropriate mechanism. In other embodiments, the network 106 may represent a direct connection (e.g., a physical connection) between the data centers 102, 104.

Figure 4:
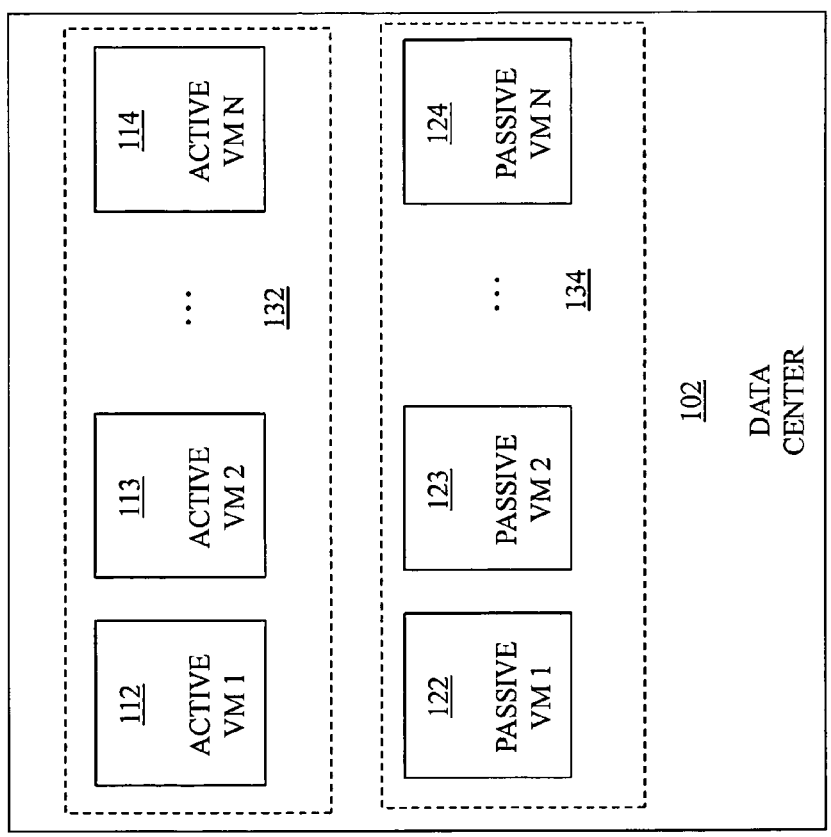
FIG. 4 is a schematic illustration of showing the data center in more detail as including a plurality of active VMs and a plurality of passive VMs that may be used in connection with an embodiment of the system described herein.

FIG. 4 is a schematic illustration of showing the data center 102 in more detail as including a plurality of active VMs 112-114 and a plurality of passive VMs 122-124 that may be used in connection with an embodiment of the system described herein. The other data center 104 may be similarly configured with respect to VMs. In an embodiment herein, data centers may include active VMs that are directly operational and passive VMs that are images of active VMs on other data centers. For example, the active VMs 112-114 may have corresponding passive VM counterparts at the data center 104 and, similarly, the passive VMs 122-124 may be counterparts to active VMs at the data center 104. In an embodiment herein, the passive VMs 122-124 may be used for failover so that, for example, if one or more corresponding active VMs stops working (e.g., due to hardware failure), it is possible to convert the corresponding passive VM into an active VM and continue work with the newly-activated VM.

The active VMs 112-114 may be provided in an active repository 132, which includes one or more logical storage volumes for maintaining the active VMs 112-114. Similarly, the passive VMs 122-124 may be provided in a passive repository 134, which includes one or more logical volumes. Each of the volumes of the active and passive repositories may include multiple VMs. In various embodiments, VMs may be migrated from a source one of the data centers 102, 104 to a target one of the data centers 102, 104. Reference is made to U.S. patent application Ser. No. 12/932,080 to Meiri et al., filed Feb. 17, 2011, entitled "VM Mobility Over Distance," which is incorporated herein by reference and is assigned to the assignee of the present application.

As further discussed elsewhere herein, one or more of the data centers 102, 104 may use thin provisioning with a mechanism for reclaiming released storage space and/or for reserving storage space. Such mechanisms are disclosed in U.S. patent application Ser. No. 12/924,388 to Balcha et al., filed Sep. 27, 2010 entitled "Storage Space Reclaiming for Virtual Provisioning," and U.S. patent application Ser. No. 12/924,474 to Fradkin et al., filed Sep. 28, 2010, entitled "Virtual Provisioning Space Reservation," which are both incorporated by reference herein and are assigned to the assignee of the present application.

Figure 5:
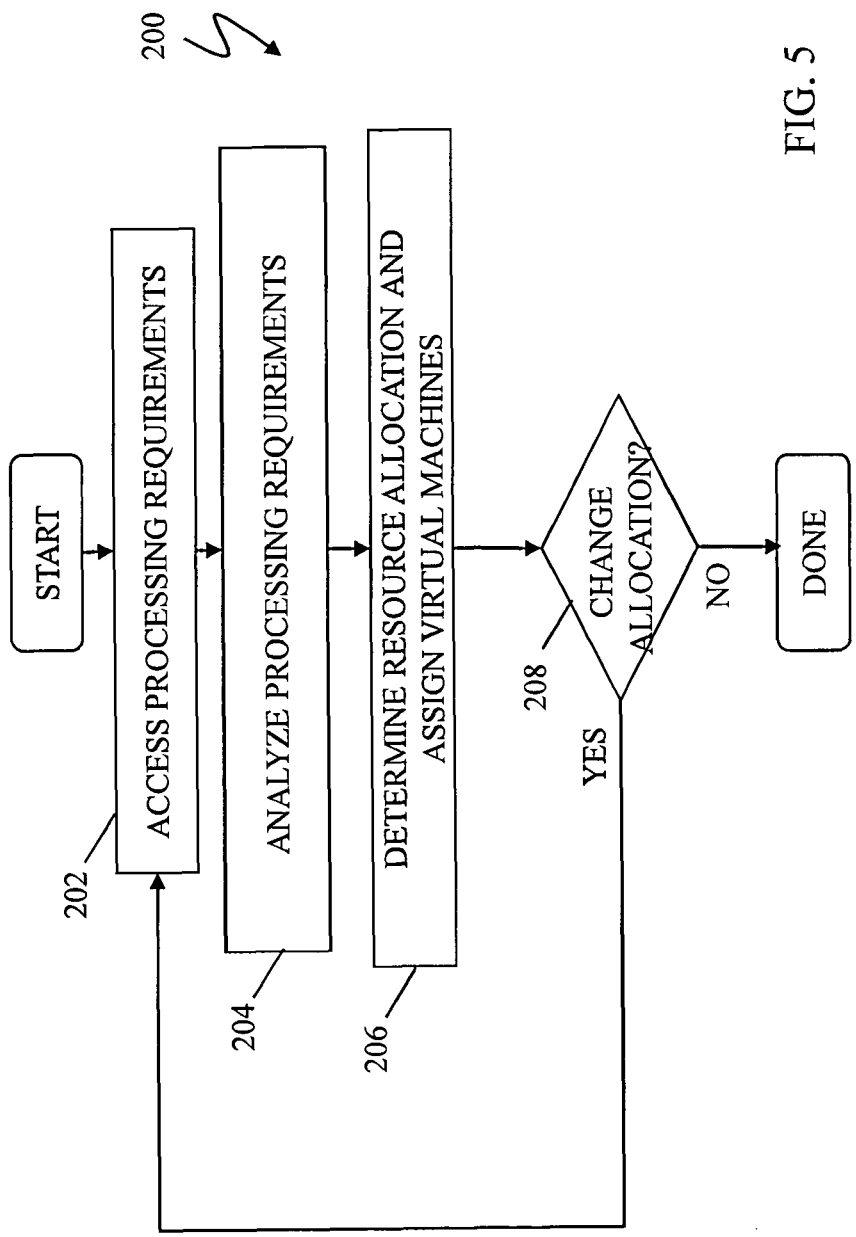
FIG. 5 is a flow diagram showing a method of allocating resources in accordance with an embodiment of the system described herein.

FIG. 5 is a flow diagram 200 showing a method of allocating resources in accordance with an embodiment of the system described herein. At a step 202, a processor or other software-tool component may access stored user processing requirements, such as compute processing requirements including CPU cycles and/or memory resources, for a computing environment. In an embodiment, the processing requirements may be obtained from users' SLAs and/or input by the user in connection with the system described herein. After the step 202, processing proceeds to a step 204 where the users' virtual machine needs are analyzed according to the obtained processing requirements and one or more VMs are determined based thereon. After the step 204, processing proceeds to a step 206 where the VMs of one of more of the users are provisioned and may assigned to one or more of the clusters of VMs in connection with an allocation of resources that supports the users' virtual machine needs based on the obtained processing requirements.

After the step 206, processing proceeds to a test step 208 where it is determined whether the allocation of resources for one or more of the clusters needs to a modified to reflect changed processing requirements. For example, the changes to the processing requirements may include a change to one or more of the SLAs of current users' reflecting changes in the virtual machines required for the current users, may include a change to assign virtual machines from a new user and/or may reflect the tracking of usage metrics of the users, as further discussed elsewhere herein. Alternatively, the system may automatically periodically review the allocation of resources to determine if changes are necessary for current user SLA requirements. If at the test step 208, it is determined that resource allocation is to be modified, processing may proceed back to the step 202. If at the test step 208, it is determined that the resource allocation is not to be modified, then processing is complete.

According to the system described herein, a storage pool manager (SPM) may simplify the provisioning and assigning of resources, including storage, for virtualized environments (VEs). Virtualized server environments, for example, as represented by VMware, may be highly dynamic. For example, users may provision a new server on a virtual machine (VM) in minutes in a VE. However, with known storage systems, storage provisioning may not be dynamic, but rather be intended to be done by a centralized resource, the storage administrator, who has the specialized skills necessary to provision storage from the storage array. As a consequence of this, under known techniques, provisioning new storage from a storage array for a VM can take days, for example. The SPM according to the system described herein may make storage provisioning as dynamic as the virtualized server provisioning. The SPM may accomplish this by pushing the provisioning of storage to the VE end-user and by simplifying it so that a non-storage savvy VE user can provision the storage.

According to various embodiments, the SPM may involve use of a storage type and a virtual container, e.g., called a root sandbox, to provide capability of storage provisioning to non-storage savvy VE users according to the system described herein. A storage type may be a label for a particular kind of storage. This makes it simple for a user to provision the type of storage that is desired. Thus, instead of a VE user provisioning 50 GB of RAID5 3+1 storage on 10,000 RPM FC drives, the VE user may simply provision 50 GB of "Silver" or 50 GB of "Tier2" storage. The storage administrator may define the types of storage available. The storage administrator may do this by using defined storage tiers, such as in a fully automated storage tiering (FAST) system, and/or by creating a custom type. The storage administrator may create custom types by selecting the properties of the physical storage: disk type (e.g., SATA, FC, SSD), disk speed (e.g., 7200, 10,000, 15,000), and RAID configuration (e.g., RAID6 14+2, RAID6 6+2, RAID5 7+1, RAID5 3+1). In various embodiments, the storage administrator may also define storage types according to a FAST policy or a FAST SLA.

While SPM allows VE users to provision storage, it is recognized that the storage administrator may still own and control the storage array, and thus may need to be able to set boundaries or parameters around what storage the users can provision. These boundaries and parameters may be defined by the sandbox.

A sandbox is an example of a logical storage construct (virtual container) that may be configured using one or more physical storage arrays (e.g., Symmetrix) in which the storage administrator has given VE users permission to create LUNs. In an embodiment, the storage of the sandbox may include one or more thin pools of storage. A thin pool of storage corresponds to the storage concept of thin or virtual provisioning that allows for the creation of logical volumes of storage space where allocation of physical storage space occurs only when space is actually needed (e.g., when data is written the first time to the storage space). For further discussion of storage techniques involving thin provisioning and the use thin devices in one or more thin pools, reference is made, for example, to U.S. patent application Ser. No. 11/823,152 to Burke, filed Jun. 27, 2007, entitled "Storage Management for Fine Grained Tiered Storage with Thin Provisioning," and to U.S. Pat. No. 7,822,939 to Veprinsky et al., entitled "Data De-duplication using Thin Provisioning," which are both incorporated herein by reference. In other embodiments, the storage of the sandbox may include storage pools other than thin pools, such as thick pools, pools for FAST policies, etc.

Figure 6:
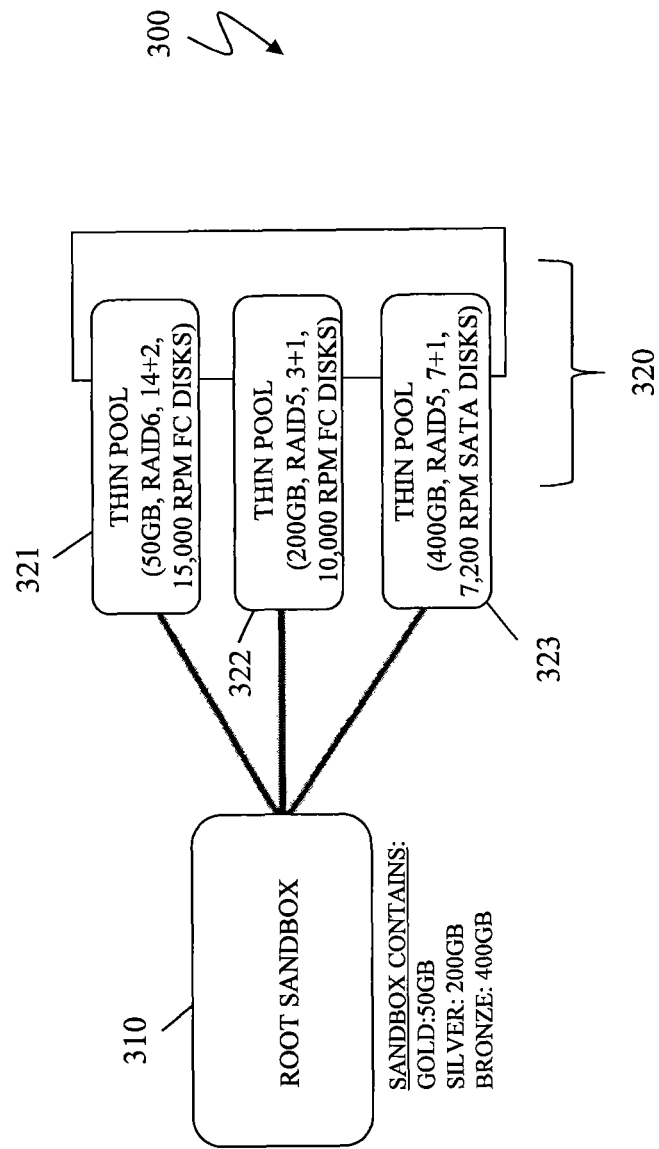
FIG. 6 is a schematic illustration showing a system including a storage array with thin pools and a root sandbox according to an embodiment of the system described herein.

FIG. 6 is a schematic illustration showing a system 300 including a storage array 320 with storage pools, such as thin pools 321-323 and a root sandbox 310 according to an embodiment of the system described herein. In an embodiment, the storage array 320 may be a Symmetrix storage array and/or other appropriate storage array. Each thin pool may be storage of a particular type, which may be defined by the type of data devices that make up the thin pool. For example, if "Silver" type storage has been defined by the storage administrator to be RAID5 3+1 on 10,000 RPM FC drives and the data devices in thin pool tp1 321 contain data devices that match this, then tp1 321 is said to contain "Silver" storage. Thus, if the storage administrator puts thin pool tp1 321, which has a storage capacity of 200 GB, in the sandbox 310 then the sandbox 310 contains 200 GB of "Silver" storage. Multiple thin pools may be put into the same sandbox, as long as they are from the same array and are different storage types. Therefore, it would be possible, for example, for the sandbox 310 to have 50 GB of "Gold" storage, 200 GB of "Silver" storage and 400 GB of "Bronze" storage, as illustrated.

Once the storage administrator fills the sandbox 310 with various types of physical storage, the storage administrator may assign the sandbox 310 to a VE virtual center instance, such as a vCenter. This makes the storage in the sandbox 310 available to that virtual center and allows VE administrators and users of that virtual center to provision storage from the sandbox according to the system described herein. It is noted that the sandbox 310 may be configured by the storage administrator using the graphical user interface (GUI) of a storage management console (SMC), as further discussed elsewhere herein.

Figure 7:
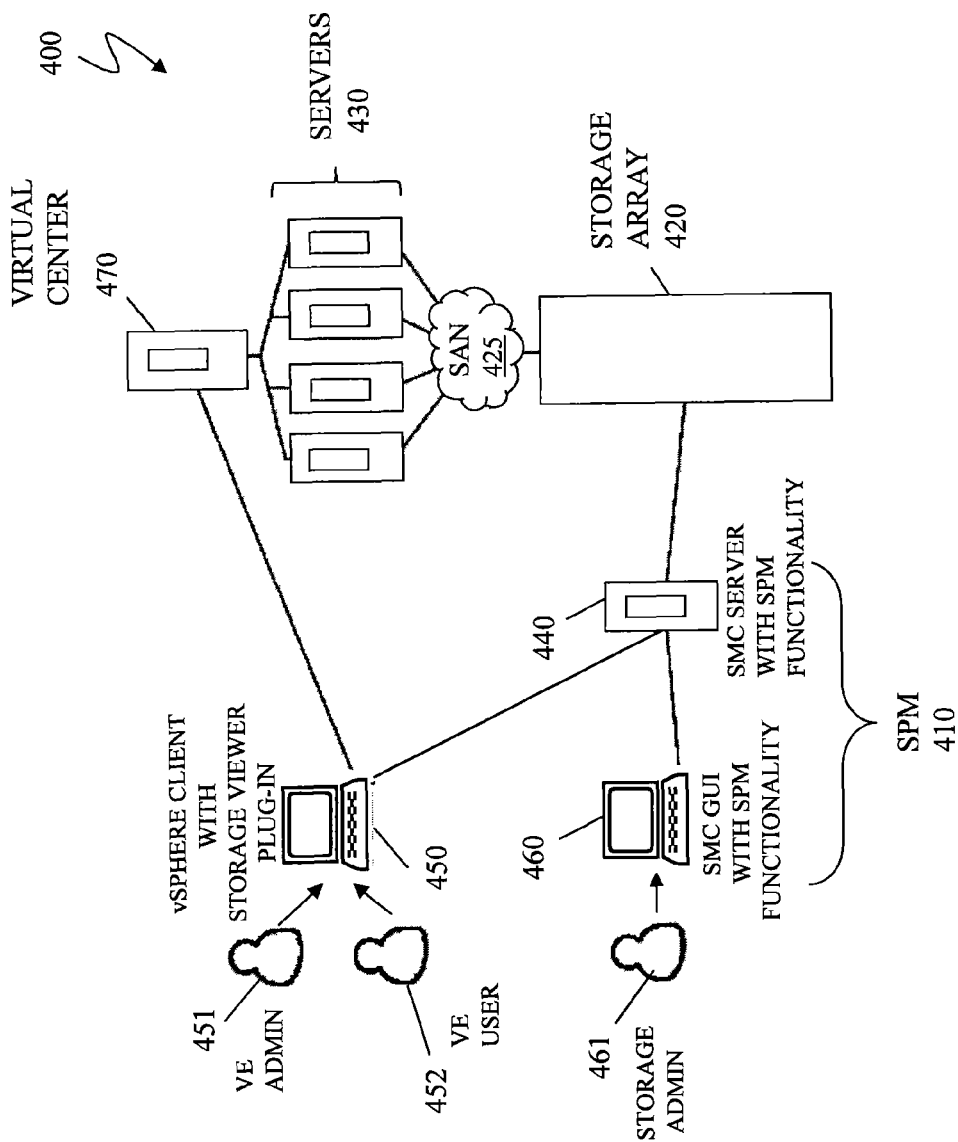
FIG. 7 is a schematic illustration showing a virtualization environment (VE) including an storage pool manager (SPM) according to an embodiment of the system described herein.

FIG. 7 is a schematic illustration showing a virtualization environment 400 including an SPM 410 according to an embodiment of the system described herein. The components in the illustrated environments are: a storage array 420, such as a Symmetrix array; one or more ESX servers 430 and/or other similar type of servers; a storage area network (SAN) 435; an SMC server 440 with SPM functionality; a cloud-computing client 450, such as a computer running vSphere with a storage viewer plug-in (e.g., storage viewer products produced by EMC Corp.); and a computer with a SMC GUI 460 with SPM functionality enabled; and a virtual center server 470. The SPM 410 functions may be performed using a combination of enhanced functions of the SMC server 440 and the SMC GUI 460, as further interfaced by the client-computing client 450 with storage view plug-in, and which enhances and abstracts the storage array 420 functionality in order to integrate storage provisioning into the VE 400. In particular, the SMC server 440 may be upgraded with the centralized SPM functions. The SMC GUI 460 may be enhanced with the SPM UI functions needed for a storage administrator 461, and functions for a VE administrator 451 and a VE user 452 may be added to the cloud-computing client 450 storage viewer.

In the VE 400, CPU cycles and memory may be managed as resources that can be allocated to create virtual machines. For instance, the sum of all the CPU cycles on all the processors on all the servers in a cluster may be used to create a "pool" of CPU cycles for the clusters. As users create VM's, the users allocate CPU cycles from this pool for the VM. Furthermore, the cluster's pool of CPU cycles can be broken down into sub-pools, called resource pools, to provide finer granularity of control where, for example, a marketing VE user could only create a VM from the CPU resources in the marketing resource pool. The same may be done for all the memory on all the servers in the cluster. The system described herein allows for storage to be treated as a third resource which can be controlled and allocated in the same way.

The SPM 410 may provide a mechanism for the storage administrator 461 to setup a bounded set of physical storage and allow him to give this set of physical storage to VE users (e.g., the VE user 452) for them to provision. The SPM 410 may only allow VE users to provision storage that they have been given permission to by the storage administrator 461. The SPM 410 simplifies storage provisioning and provides a tight integration with VM provisioning by allowing VE users to provision storage from within the cloud-computing client 450 (e.g., vSphere) thereby allowing VE users to easily create a raw device mapping (RDM) LUN for a VM or a virtual machine file system (VMFS) data store for a cluster. Further, the SPM 410 may integrate storage as a third VM resource. Thus, storage may become a resource that can be managed and allocated as part of VE clusters and resource pools, just like CPU cycles and memory. In an embodiment, the SPM 410 may further support Symmetrix V-Max arrays and offers advantages in scale and registration. For example, in an embodiment, each SMC server 440 may manage up to 5,000 SPM LUNs.

The SMC server 440 may include a server component in a manager element of the storage array 420. The SMC server 440 allows the storage administrator to control one or more storage arrays via a browser based GUI 460. The SMC server 440 stores the SPM data and performs SPM functions as requested by the storage administrator via the SMC GUI 460, and requested by the VE users and administrators via the client storage viewer 450. In an embodiment, a single SMC server can support multiple clients. The SMC GUI 460 may be a client front end to the SMC server 440.

The storage viewer may be a plug-in to the VE client 450. In an embodiment, the storage viewer may be a storage viewer product produced by EMC Corp. and the VE client 450 may be VMware's vSphere client. The storage viewer may provide the VE user 452 and the VE administrator 451 with the user interface to interact with the SPM functionality. In addition, the storage viewer may contain some logic to perform some of the VE tasks related to storage provisioning. In an embodiment, for example, a VE client 450 may talk to more than one SMC/SPM server 440.

As discussed herein, the functions of the SPM 410 may be performed according to three types of users, or roles: the storage administrator 461; the VE administrator 451; and the VE user 452. It may be noted that the VE administrator 451 may also perform the functions of the VE user 452. Further, in an embodiment, the functions of the SPM 410 may be broken down into four operational phases which are listed below and further discussed elsewhere herein:
 1. preparing the storage environment;
 2. setting up the sandbox;
 3. allocating storage to VE resources; and
 4. creating VE storage.

The SPM 410 may automate several tasks, for instance mapping and masking, that were previously performed manually. These automated functions are further discussed elsewhere herein.

The storage administrator 461 may interact with the SPM 410 via the SMC GUI 460. The storage administrator 461 may be responsible for:
 1. creating views; including the initiator groups, port groups and storage groups; for masking LUNs to VE clusters;
 2. setting-up authorizations for the VE server on the thin pools and storage groups in the views;
 3. creating and defining storage types;
 4. creating and deleting sandboxes;
 5. assigning thin pools to sandboxes;
 6. assigning previously created views to the sandboxes;
 7. setting policies for sandboxes; policies may include maximum and minimum LUN size and maximum number of LUNs created from the sandbox;
 8. setting any pre-creation policies (see a following section that describes pre-creation); and
 9. assigning a sandbox to a vCenter server.
For these functions, the storage administrator 461 may be logged into the SMC 460 as a user with the admin or storage admin role.

The VE administrator 451 may interact with the SPM 410 via the a GUI on the cloud-computing client 450 with the storage viewer plug-in. The VE administrator 451 may be responsible for assigning storage to VE objects, data centers, clusters, and resource pools, from the sandboxes which have been assigned to the vCenter server 420. In an embodiment, the VE administrator 451 may be restricted to assigning storage only to those VE objects to which he has VE authorization to administer.

The VE user 452 may interact with the SPM 410 via the cloud-computing client 450 GUI with the storage viewer plug-in. In an embodiment, the VE user 452 may:

1. create and delete an RDM LUN for a VM;
2. create and delete a VMFS data store for a cluster; and
3. expand a VMFS data store.

The VE user 452 may be restricted to provisioning storage only to those VM's to which the VE user 452 has VE authorization to configure.

The following discussion further describes the four operational phases of the SPM 410 according to various embodiments of the system described herein.

Preparing the storage environment may be performed by the storage administrator 461 and may involve some setup of the storage array 420 and the SPM 410 so that later operations, such as sandbox creation and storage provisioning, can be successfully completed. The following is a set of array operations that the storage administrator 461 may perform so that the SPM 410 may be used successfully. The operations may be performed done using the standard SMC functionality. Thin pools may be created that may later be put into sandboxes (see FIG. 6). Masking views for the server clusters may be created in the VE environment 400.

For each VE cluster that LUNs will be provisioned to, a view may be created, as further discussed elsewhere herein. A view may include a port group whose ports are in the same zone as the ports in the VE cluster. A view may also include an initiator group which contains all the WWN's for each port on each server in the VE cluster, regardless of whether the port is in use or zoned to the array. The SPM 410 may also support cascaded initiator groups so if the cluster server ports are in more than one initiator group they can be cascaded into a single initiator group. Finally, each view may include a storage group. The storage group may be an existing one and/or may be a new one. If it is a new one, it may be created with a single device that will not be used unless it is adopted.

In an embodiment, authorizations may be set on the storage array 420, such as a Symmetrix storage array. While not required, if authorizations are turned on in the storage array 420, then several authorizations may need to be added. These authorizations allow VE users through the SPM software to create/delete LUNs and mask them to the VE servers 430. Each vCenter server 470 may be authorized on each thin pool that is assigned to the vCenter server 470. Each vCenter server 470 may be authorized on each storage group in the views in each sandbox assigned to the vCenter server 470. In addition to these array functions, the storage administrator 461 may ensure that the SAN 425 is zoned so that front end array ports planned to be used are in the same zone(s) as the servers 430 in the VE cluster(s).

The SPM 410 functions that are performed in preparing the storage environment may include creating the storage types and setting up the client security. Setting up client security may be the setting of a password that authenticates the storage viewer clients with the SMC server.

After the storage environment has been prepared, the storage administrator 461 may begin creating sandboxes and assigning them to virtual center instances. Setting up a sandbox may involve creating a sandbox with a name, description, and the GUID of the vCenter that the sandbox is assigned to. Previously created views to the sandbox may be assigned. In an embodiment, there may be one, and only one, view for each VE cluster that the storage in the sandbox will service. Previously created thin pools may be added to the sandbox.

Note that, in an embodiment, all the thin pools added to the sandbox may come from the same array. When adding a thin pool to the sandbox the storage administrator has two decisions to make. A first decision concerns storage type; if the data devices composing the thin pool match more than one storage type then the user needs to choose which one to assign to the thin pool. In an embodiment, a sandbox may only contain one thin pool of each storage type. A second decision concerns capacity to commit to the sandbox—all of a thin pool's available capacity may be committed to the sandbox, however, it is also possible to only commit a portion of it. The capacity that is committed may be subscribed capacity and not physical capacity.

The provisioning policies may be then be determined. The policies that may be set for a sandbox include:

1. maximum number of devices provisioned from the sandbox;
2. maximum size of the devices;
3. minimum size of the devices; and/or
4. only allow LUNs of sizes that match the pre-created sizes to be provisioned.

Pre-creation policies may also be set as further discussed elsewhere herein.

After a sandbox has been assigned to a virtual center server by the storage administrator, the next operational phase is for the VE administrator to allocate storage to VE resources or objects. In the VE, the highest level object may be the virtual center that may be a centralized management server. A virtual center server can control one or more data centers. A data center may be composed of one or more clusters. A cluster may be composed of one or more ESX servers.

As discussed elsewhere herein, CPU cycles and memory may be compute resources. The sum of all the CPU cycles and memory of the servers in the cluster may determine the cluster's compute resources. A cluster's compute resources can be divided into resource pools. Resource pools can be further divided into more resource pools. VM's are created from the compute resources of a cluster or one of its child resource pools. The system described herein provides that storage may be added as another resource to the virtualized environment along with the CPU cycle and memory resources.

Figure 8:
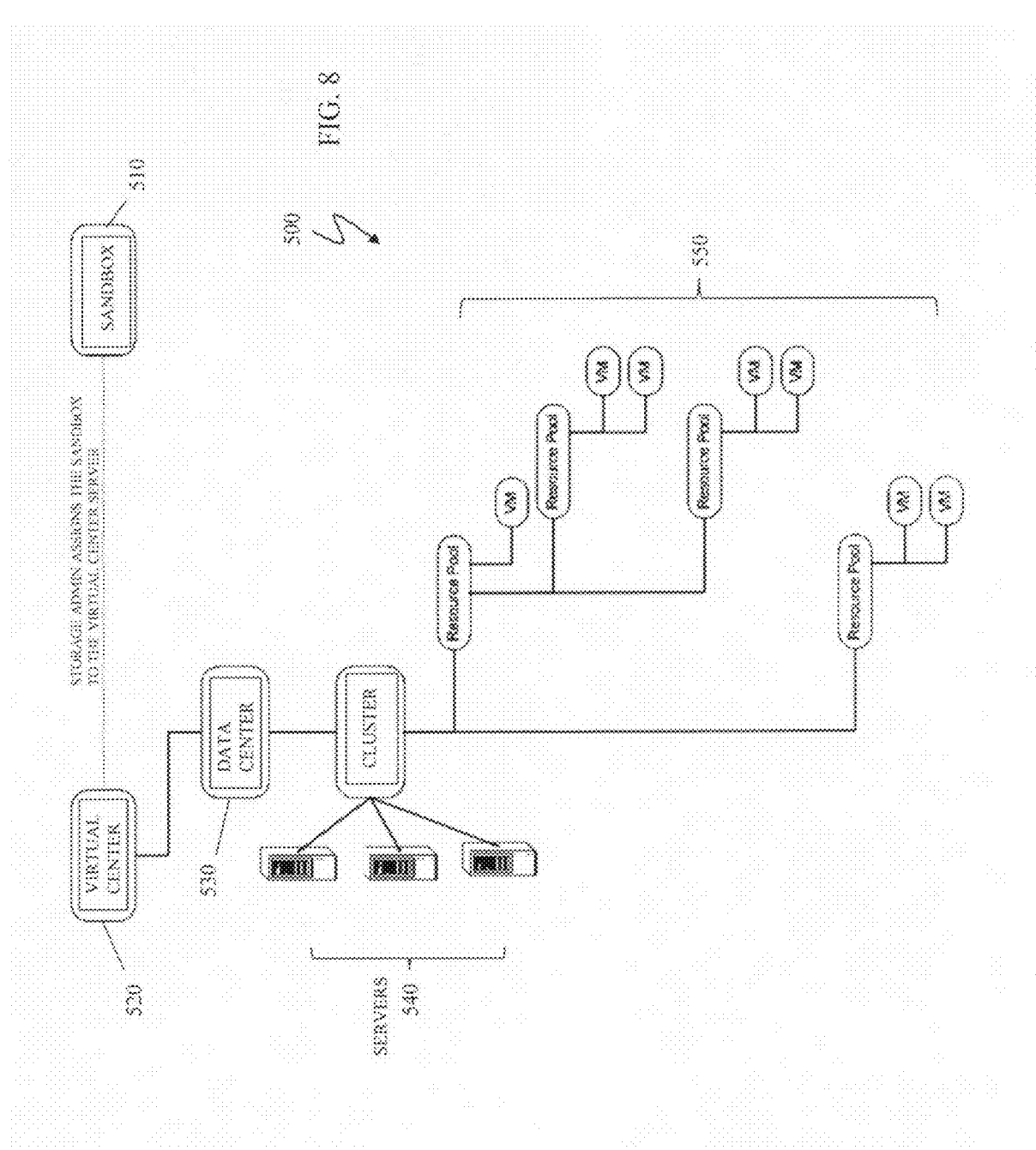
FIG. 8 is a schematic illustration of a VE hierarchy for compute and storage resources using a sandbox according to an embodiment of the system described herein.

FIG. 8 is a schematic illustration of a VE hierarchy 500 for compute and storage resources using a sandbox 510 according to an embodiment of the system described herein. After the storage administrator creates the sandbox 510, the storage administrator may assign the sandbox 510 to a virtual center 520. This makes the storage in the sandbox available as a storage resource to a data center 530, a server cluster 540 and resource pool 550 managed by that virtual center 520 using VMs. A VE administrator, who has the permissions necessary to set the compute resources for a cluster or resource pool, can also set the amount of storage available to that cluster or resource pool as well.

Figure 9:
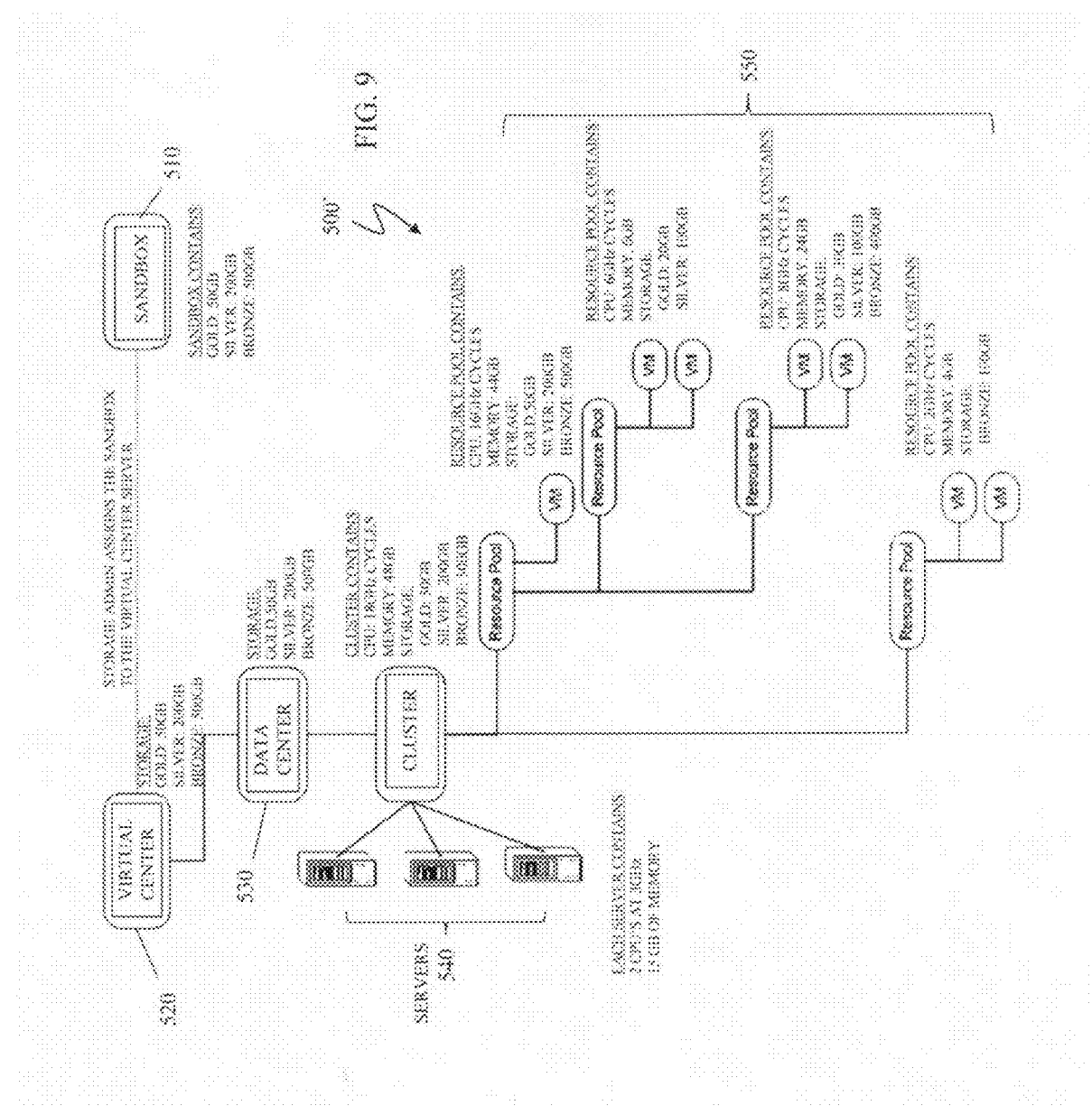
FIG. 9 is a schematic illustration showing a VE hierarchy, like the VE hierarchy in FIG. 8, with an example assigning of sandbox storage resources using a resource scheme according to an embodiment of the system described herein.

FIG. 9 is a schematic illustration showing a VE hierarchy 500', like the VE hierarchy 500 shown in FIG. 8, with an example assignment scheme of resources including sandbox storage resources (e.g., CPU, memory and storage: Gold, Silver, Bronze) according to an embodiment of the system described herein. The storage administrator may assign the sandbox 510 with 50 GB of Gold, 200 GB of Silver and 500 GB of Bronze storage to the virtual center 520. The storage in the sandbox 510 is available to the virtual center 520. Note that it is possible to assign more than one sandbox to the same virtual center.

A VE administrator may now assign the storage available to the virtual center 520 to one or more data centers, like the data center 530, that are children of the virtual center 520. In this example, since there is only one data center 530 shown that is controlled by the virtual center 510, the VE administrator may assign all of the storage to that data center 530. Additionally, there is only one cluster 540 in the data center 530 so the VE administrator also assigns all the storage in the data center 530 to the cluster 540. The cluster 540 has compute resources, CPU and memory, and the storage assigned to the cluster thus becomes another resource to the cluster 540. The VE administrator who has control over the cluster 530 can divide the storage resources among the cluster's child resource pools 550, just like division of the CPU and memory resources.

In an embodiment, although the VE administrator may explicitly assigned storage resources to each data center 530, cluster 510 and resource pool 550, is not necessary to do this. If storage resources are not explicitly assigned to a VE object, e.g. one of the resource pools 550, then the object may use the storage resources assigned to its parent object. If none are assigned to its parent object, then it can get resources from its parent's parent and so on all the way up to its parent virtual center. Thus, if no storage resources are explicitly assigned, each data center 530, cluster 540 and resource pool 550 may have access to all the storage in the sandbox(es) 510 assigned to the virtual center 520. However, once storage is explicitly assigned to an object, it may not go up to its parent to get additional storage resources. According to an embodiment, best practices may dictate that the storage resources should be explicitly assigned down to at least the cluster level.

The final operational phase of the SPM 410 is the actual provisioning of storage by the VE user. In an embodiment, there may be two types of VE storage: raw data mapping (RDM's) and virtual machine file system (VMFS) data stores. RDM's are LUNs that are seen by the ESX server and passed to a VM. This allows the VM direct access to and ownership of the LUN. VMFS data stores are also built from LUNs. The VMFS data stores may contain numerous VE files, including files that represent virtual hard drives used by the VMs. A VE user can use SPM functionality to create either one of these types VE storage.

In order to create an RDM, the VE user, via the cloud-computing client (e.g. vSphere), selects the VM for which the RDM is to be created. For a VMFS data store, the VE user may first select the cluster the VMFS data store will span. In either case a LUN is created and exposed to the ESX cluster, either the cluster the VM is running on, or the one for the VMFS. The LUN may be created from the storage available to the cluster for the VMFS, or the cluster or resource pool the VM is in for an RDM. The user enters a size and selects a type of storage, e.g. "Gold" or "Silver", from the cluster's or resource pool's available storage. This request is sent from the cloud-computing client to the SPM/SMC server which determines the correct thin pool to use, creates a thin device in that pool, and then masks it to the cluster's server ports. After the LUN/thin device has been created, and mapped and masked, the cloud-computing client maps it as an RDM to the VM or formats it as a VMFS.

According to the system described herein, the SPM 410 may automate several functions that today must be performed by the storage administrator, VE administrator or VE user. For example, when the VE user creates a LUN for an RDM or VMFS, a thin device is created in a thin pool. This thin device is mapped to a set of front end array ports and then masked to the ESX cluster the LUN is needed on. SPM does this by automatically putting the device into the storage group which belongs to the view associated with the sandbox which has an initiator group that matches the server ports for the VE cluster that the LUN is being created for. If there is no view associated with the sandbox that has an initiator group with all the cluster ports then the create LUN fails. This prevents LUNs from being created that are only masked to some of the servers in the cluster or not masked to all the paths to each server.

A VE user may create a new VMFS data store. In addition to creating the LUN and masking it to the cluster, a portion of the SPM 410 may take care of the additional VE steps to turn the LUN into a VMFS data store. A VE user may further create a new RDM LUN for a VM. In addition to creating the LUN and masking it to the cluster the VM sits on, a portion of the SPM 410 may take care of the additional VE steps to turn the LUN into an RDM and map it to the VM.

The VE administrator may use the cloud-computing client to refresh the server membership of a cluster. This updates SPM knowledge of what server port WWN's comprise the clusters. Each time a LUN is created the WWN's for the cluster are checked against the initiator groups to make sure that the LUN is masked correctly to cluster. If the server membership changes the storage administrator must update the initiator group for the server cluster.

In an embodiment, the SPM 410 may automatically track the used and available storage for each VE object. For example, if a resource pool has 60 GB of Silver storage, of which 10 GB of used, and a VE user creates a 15 GB RDM from Silver storage for a VM in that resource pool, then after the RDM creation there will be 25 GB of used and 45 GB of available Silver storage for the resource pool. The SPM may also enforce the provisioning policies that the storage administrator sets on the sandbox. Policies may include, for example: maximum number of LUNs provisioned; maximum LUN size; minimum LUN size; and provisioning only pre-created LUN sizes.

The VE's VM's may be created quickly, for example, in less than a minute. However, even with SPM's automated functionality it may still take longer (e.g., 3 to 6 minutes) to create a new thin device and map and mask it to a cluster. In order to bring the time it takes to provision storage more in line with the time it takes to create a VM, the SPM 410 allows the storage administrator the option of setting one or more thin device pre-creation policies for a sandbox. A pre-creation policy allows the storage administrator to specify that N thin devices of a particular size and a particular type are pre-created for the sandbox. Thus when a VE user creates a thin device, for an RDM or VMFS, if the VE user chooses one of the pre-created sizes the provisioning time is reduced to the time it takes to map and mask the device. If the VE user chooses a size that is not pre-created then he must wait the additional time it takes to create the thin device.

The pre-creation policy may cause devices of particular sizes to be pre-created and reserved for SPM use. These may be called SPM un-used LUNs. When a VE user creates a LUN of this size, the SPM will look for an SPM un-used LUN of this size. If one exists, that LUN will use it instead of creating a new device from scratch. This may significantly speed up the provisioning process as the pre-created device simply has to be added to the correct storage group to mask it to the VE servers.

A pre-creation policy may be defined by one or more of the following:
 1. a capacity;
 2. number of devices that will be pre-created at one time;
 3. sandbox the policy is associated with; and
 4. storage type the policy is for.
The combination of the sandbox and the storage type may determine which thin pool the pre-created devices are created in.

In an embodiment, after the last device of a pre-created size is used, N more devices of that size may be created in the thin pool and added to the SPM reservation. N is the number specified in the pre-creation policy. New, pre-created, devices may not be created when a new pre-creation policy is setup or modified. They may only be created after a LUN is created and there are no pre-created devices of that size left. Thus, the first LUN created of a size that matches a newly setup pre-creation policy will always be created from scratch, but afterwards N pre-created devices of that size will also be created and the second LUN of that size will use one of those pre-created devices.

On each storage array (e.g., Symmetrix), a reservation may be created for the SPM 410. Thin devices created by SPM 410, including pre-created ones, may be reserved under this reservation. This allows storage administrators managing the storage array to know which devices are under the control of SPM 410. The SPM 410 may automatically create an SPM reservation. All devices that are under the SPM's control may be reserved with this reservation. This makes the storage administrators working on the storage array aware that these devices are being used by the SPM 410. Devices may be added to the SPM reservation when they are created by the SPM 410 and/or when they are adopted into the SPM 410. Devices may be released from the SPM reservation when they are deleted by SPM 410 and/or when the thin pool they are in is removed from a sandbox, as further discussed elsewhere herein. If a thin pool is associated with multiple sandboxes, then only the devices for LUNs in the sandbox the thin pool is being removed from are released from the reservation.

In an embodiment, for backup and restore functionality, SPM meta-data may be backed up to an external directory (the meta-data may exist as a set of files). The SPM configuration may be restored from a previous backup. Note, that best practice may be for the SPM meta data to be backed up along with the masking database. It is also possible for the SPM configuration to get out of sync with the VE configuration. This is because the VM user may take actions through the cloud-computing client that SPM will not be aware of. An example of this is moving a VM from one resource pool to another. Refreshing the SPM configuration may align it with the current VE configuration. The expectation is that the SPM 410 may be deployed in an existing VE configuration (e.g., an existing VMWare configuration) so that it can be used to handle any new storage provisioning. This may require that the SPM 410 be able to adopt existing LUNs and bring them under SPM control. Note that this feature may only be available for thin LUNs/devices.

The SPM 410 according to the system described herein accommodates a number of use cases and functional details related to functions of the storage administrator, VE administrator and the VE user according to various embodiments of the system described herein. Examples of these use cases and functional details are discussed elsewhere herein in connection with TABLES 1-26.

The following discussion provides further detail on the internal behavior of the SPM 410 in connection with features of the system described herein.

According to the system described herein, LUN creation may be initiated by a VE user requesting to create a LUN for a VE cluster, for example as an RDM for a VM or a VMFS data store for the VE cluster. The request may come to the SMC server as a request to create a LUN with the following parameters:
1. sandbox to take the storage from;
2. storage type in the sandbox to use;
3. capacity or size; and
4. cluster the LUN will be masked to.

Figure 10:
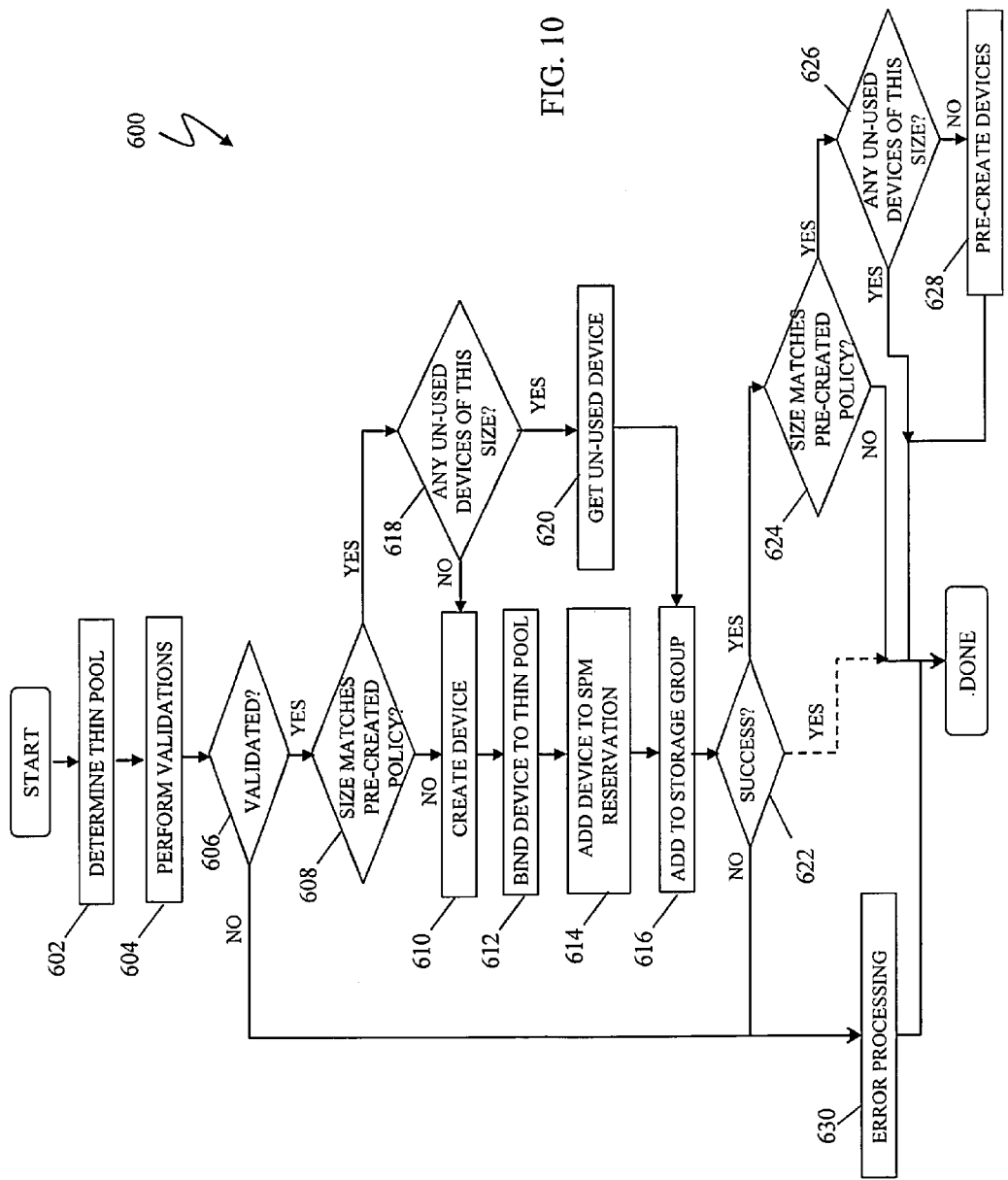
FIG. 10 is a flow chart show LUN creation operations performed using the SPM according to an embodiment of the system described herein.

FIG. 10 is a flow chart 600 show LUN creation operations performed using the SPM 410 according to an embodiment of the system described herein. At a step 602, processing is performed to determine the thin pool from which to create the LUN device. The sandbox and storage type may be used to determine the thin pool the device will be created in. After the step 602, processing proceeds to a step 604 where validations are performed. Several validations may be done before the device is created on the storage array. The validations may include that the cluster may be used to verify that all the server ports in the VE cluster are represented in an initiator group in a view that is associated with the sandbox. Further, the sandbox provisioning policies may be examined to make sure that creating this device would not violate any of the policies, e.g. maximum or minimum size. Additionally, it may be determined whether the vCenter may be authorized to perform operations on the thin pool and the storage group to be used for the masking.

After the step 604, processing proceeds to a test step 606 where it is determined whether the validations were successful. If not, then processing proceeds to a step 630 where error processing is performed, as further discussed herein. If the validations have been successfully performed, processing proceeds to a test step 608 involving examination of the sandbox pre-creation policies to determine whether a size (capacity) of the device to create matches one of the pre-creation policies. If the size does not match a pre-creation policy, then processing proceeds to a step 610 where a device is created from scratch. After the step 610, processing proceeds to a step 612 where the device is bound to the thin pool. After the step 612, processing proceeds to a step 614 where the device is added to the SPM reservation. After the step 614, processing proceeds to a step 616 where the device is added to the appropriate storage group.

If, at the test step 608, it is determined that the size of the device to create does match one of pre-creation policies, then processing proceeds to a test step 618 where, in connection with a search of the thin pool, it is determined whether the thin pool contains an un-used SPM device of the indicated size. If one is found, processing proceeds to a step 620 where that un-used device is obtained. After the step 620 processing proceeds to the step 616 where the obtained un-used device is added to the appropriate storage group. If it is determined at the test step 618 that there are no un-used devices of the indicated size, then processing proceeds to the step 610 for creation of a new device.

After the step 616, processing proceeds to a test 622 where it is determined whether a device was successfully added to the appropriate storage group. If not, then processing proceeds to step 630 for error processing. It is noted that, in various embodiments, error evaluations may be performed at different steps in the flow chart, and may result in different processing. For example, in connection with validation errors error processing may include sending notifications or other steps that do not require deleting a newly-created device. However, if an error occurs during the creation of a LUN an attempt may be made to unwind the process and delete the device that was created. Note that there may be errors which make it impossible to unwind the device creation. Examples include a stuck configuration lock on the storage array, loss of communication with the array, among others. After the step 630, processing is complete.

If, at the test step 622, it is determined that the device (newly-created or obtained un-used device) has been added to the appropriate storage group, then, according to one embodiment, processing is complete, as is shown by a dashed lined.

However, in other embodiments, processing may proceed to a test step 624 in connection an analysis of devices of pre-created policies according to an embodiment of the system described herein. That is, at the test step 624, it may be again determined whether the added device matched the size of a pre-created policy. If not, then processing is complete since the creation of the LUN did not involve the pre-created policies.

If, at the test step 624, it is determined that the size of the LUN does match a pre-created policy, then processing may proceed to a test step 626 where is determined whether there are any un-used SPM device of this size still remaining. If there are remaining un-used SPM devices, then processing is complete since the use of a pre-created device in prior steps has not caused all un-used SPM devices of the indicated size to be used. If, however, at the test step 626, it is determined that there are now no longer any unused SPM devices of the indicated size, then processing proceeds to a step 628 where the pre-creation policy in invoked and N, as defined by the policy, unused devices may be pre-created in the thin pool. After the step 628, processing is complete.

According to another embodiment of the system described herein, LUN deletion may be initiated by the VE user when the VE user wants to delete a VMFS data store for a cluster or an RDM for a VM, for example. Before operations to delete a device is on the storage array, it may first be verified that the vCenter is authorized to perform operations on the thin pool and the storage group in which the device is located.

Figure 11:
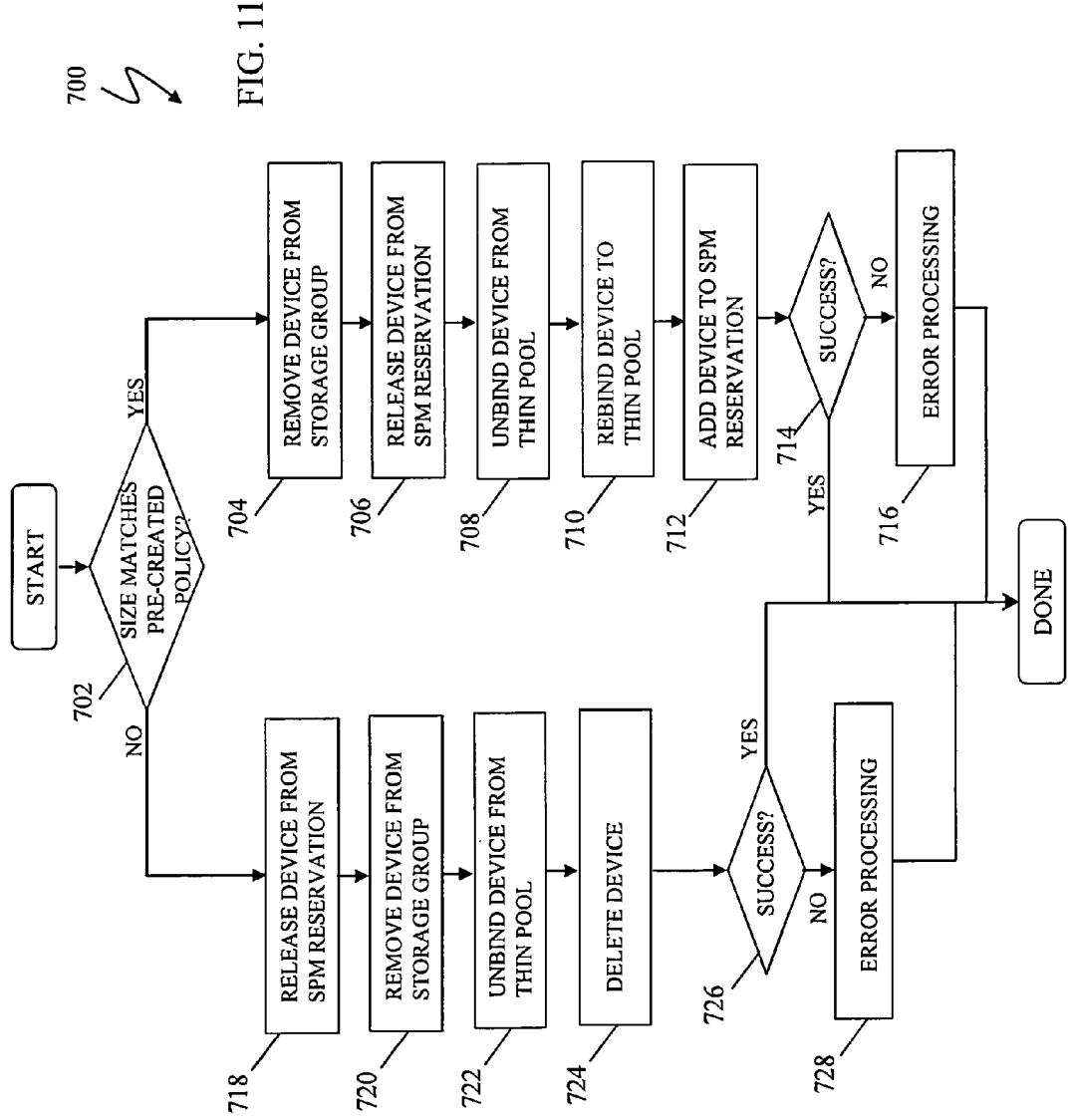
FIG. 11 is a flow chart show LUN deletion operations performed using the SPM according to an embodiment of the system described herein.

FIG. 11 is a flow chart 700 show LUN deletion operations performed using the SPM 410 according to an embodiment of the system described herein. Prior to initiation of the flow chart 700, the operations may have been appropriate validated, for example, by determining that the vCenter is authorized to perform operations on the thin pool and the storage group to be used for the masking. Processing of the flow chart 700 may begin at a test step 702 where, in connection with an examination of the sandbox pre-creation policies, it is determined whether a size of the LUN device matches a pre-creation policy.

If, at the test step 702, it is determined the size of the device to be deleted matches a pre-creation policy, then processing proceeds to a step 704, where the device is removed from storage group, making it an SPM un-used device. After the step 704, processing proceeds to steps in connection with reclaiming space from the device, including a step 706 where the device is released from the SPM reservation. After the step 706, processing proceeds to a step 708 where the device is unbound from the thin pool. After the step 708, processing proceeds to a step 710 where the device is then rebound to the thin pool. After the step 710, processing proceeds to a step 712 where the device is added to the SPM reservation. After the step 712, processing proceeds to a test step 714 where it is determined whether the device removal and space reclaiming steps were successful. If so, then processing is complete. If the steps were not successful as result of errors occurring at any of the above-noted steps, then processing proceeds to a step 716 where error processing is performed. In an embodiment, the error processing may simply be a report and/or other notification if recovery from an error that occurs during the deletion processing of a LUN is not possible. After the step 716, processing is complete.

If, at the test step 702, it is determined that the size of the device to be deleted does not match a pre-creation policy, processing proceeds to a step 718 where the device is released from the SPM reservation. After the step 718, processing proceeds to a step 720 where the device is removed from the storage group. After the step 720, processing proceeds to a step 722 where the device is unbound from the thin pool. After the step 722, processing proceeds to a step 724 where the device is deleted. After the step 724, processing proceeds to a test step 726 where it is determined whether the deletion was successful. If yes, is processing is complete. If not, then processing proceeds to a step 728 where error processing is performed. In an embodiment, the error processing may simply be a report and/or other notification if recovery from an error that occurs during the deletion processing of a LUN is not possible. After the step 728, processing is complete.

In another embodiment, during the process of creating a LUN for a VE user, after the device is created it may be masked to the servers in a VE cluster. Ultimately this may be accomplished by putting the device into a storage group which is in a view that has an initiator group with all the WWN's of the HBA ports on the servers in the cluster. If a storage administrator changes a view name, VM users may be unable to create LUNs for the cluster that the view is for. The storage administrator may update each sandbox with the new view name and also change any permissions that have been set for the view.

Figure 12:
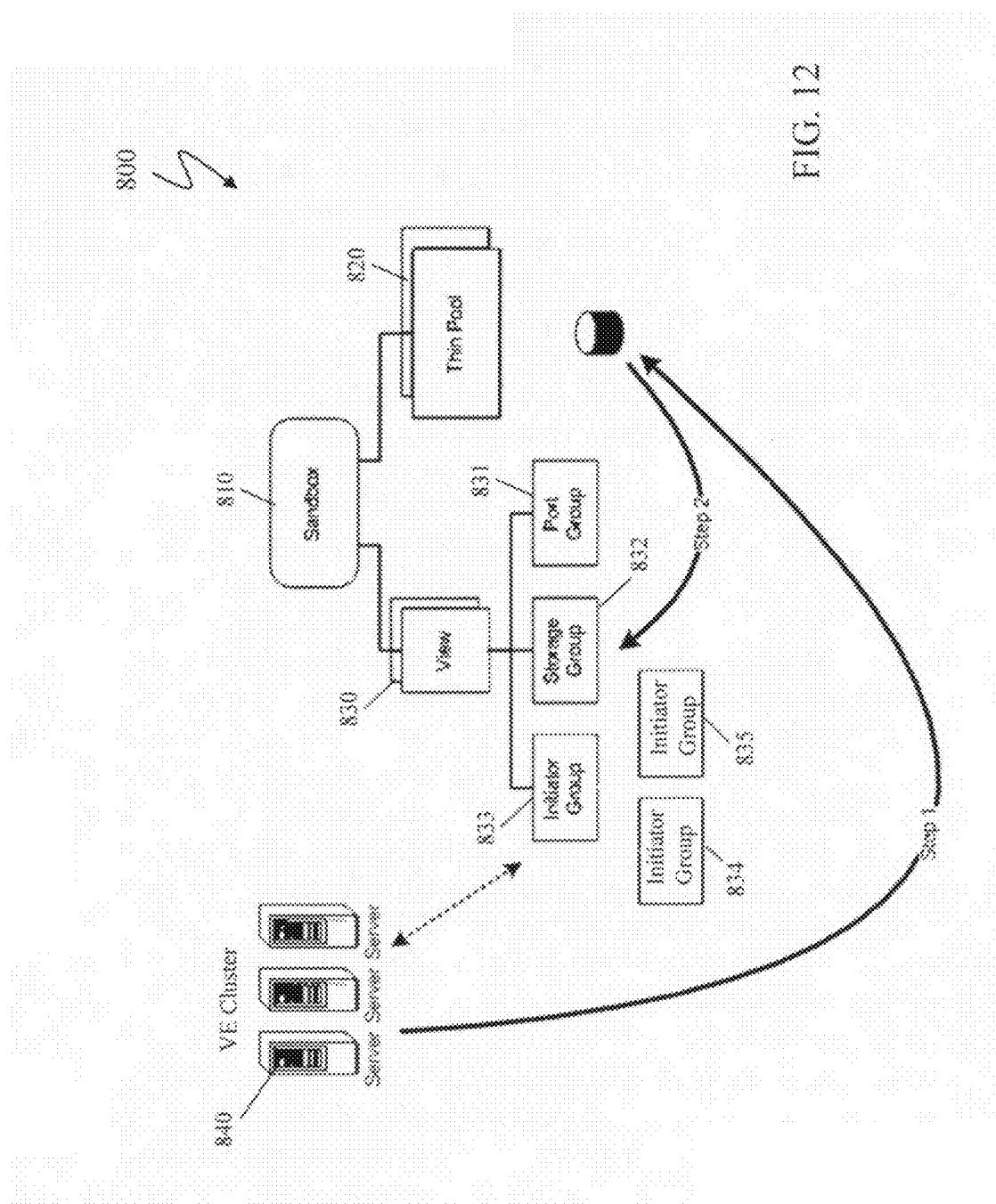
FIG. 12 is a schematic illustration showing SPM mapping and masking according to an embodiment of the system described herein.

FIG. 12 is a schematic illustration 800 showing SPM mapping and masking according to an embodiment of the system described herein. A sandbox 810 is shown and a thin pool 820 of a particular storage type may be associated with the sandbox 810. Multiple views 830 may be associated with the sandbox 810, although, in an embodiment, only one view per VE cluster 840. Accordingly, for each VE cluster 840 that LUNs will be provisioned to, a view may be created. Each of the views 830 may include a port group 831 whose ports are in the same zone as the ports in the VE cluster 840, a storage group 832 and an initiator group 833 which contains all the WWN's for each port on each server in the VE cluster 840, regardless of whether the port is in use or zoned to the array. It is illustrated with the dashed arrow that there may be a 1:1 correspondence between the WWN's of the ports of the VE cluster 840 and the initiators of the initiator group 832. The SPM 410 may also support cascaded initiator groups 834, 835 so if the cluster server ports are in more than one initiator group they can be cascaded into a single initiator group. It is noted that the storage group 832 may be an existing one and/or may be a new one. If it is a new one, the storage group 832 may be created with a single device that will not be used unless it is adopted. In a step 1, as illustrated, a device may be created in the thin pool 820 as determined by the sandbox 810 and the storage type. In a step 2, as illustrated, the device may be put into the storage group 832 that is in the view 830 associated with the sandbox 810 that has the initiator group 833 for the VE cluster 840.

In an embodiment, LUNs/devices that the SPM controls may be individually tracked by the SPM by storing meta information about each device in its persistence store. In addition, as discussed elsewhere herein, all the devices that SPM controls may be reserved by the SPM reservation and each LUN/device may have two states: (1) used—device is being used by a VE cluster and (2) un-used—device has been pre-created and is waiting to be masked to a VE cluster. The used-device may be tracked by SPM meta data, reserved by the SPM reservation and/or masked to a VE cluster by virtue of being in a storage group in a view associated with a sandbox. The un-used device may be tracked by SPM meta data and/or reserved by the SPM reservation.

In another embodiment, adopt LUNs may be used to bring LUNs/devices, that are currently not under SPM control, under SPM control. Adopting LUNs may be done to repair an SPM configuration that has been corrupted or lost, and/or to put an existing VE configuration under SPM control. Adopting LUNs occurs may after a sandbox has been created, a view(s) for the VE cluster is associated with the sandbox, and a thin pool(s) is added to the sandbox. At this point, devices that are in the thin pool(s) which have been added to the sandbox may be eligible to be adopted. In addition, an adoptable LUN is defined by a LUN that is: not reserved, or already reserved by SPM, and in a storage group that is part of one of the views associated with the sandbox. It could also be in a storage group that is in a view which has one of the initiator groups in one of the views associated with the sandbox. Basically, the LUN may be masked to one of the VE server clusters the sandbox is servicing.

When a LUN is adopted, its storage capacity is added to the total and used capacity of the sandbox, keeping the available capacity of the sandbox the same. Initially the LUN's storage is accounted for at the vCenter level. In order to have its capacity be accounted for at the correct VE object, e.g. VM for a LUN used as an RDM, a VE user needs to update the VE configuration from the storage viewer. The SPM 410, due to pre-creation policies, sometimes creates devices that are reserved by SPM 410, but are not masked to any servers. These are called un-used SPM LUNs. When a thin pool is added to a sandbox, these un-used LUNs become available for use if their size matches a pre-creation policy set for the sandbox. In a sense, they become automatically adopted.

When a thin pool is added, or modified, to a sandbox, the storage administrator may specify the amount of capacity from the thin pool to be assigned to the sandbox. The amount that is assigned is a subscribed or virtual capacity. Subscribed capacity is a presented capacity and not a physical capacity. Thus, the storage administrator may choose to over subscribe the thin pool by assigning more storage than is physically available. In order to guide the storage administrator in determining how much subscribed capacity to assign to the sandbox, the storage administrator may be presented with several values:

1. Maximum Subscribed Capacity: This value is calculated by multiplying the maximum subscription percent (set by the storage administrator in SMC) by the physically enabled capacity of the thin pool. Thus this value represents the total subscribed capacity available.
2. Current Subscription Capacity: This value is the amount of the maximum subscribed capacity of the thin pool that has already been promised, but not necessarily used, to other things. It is calculated by adding up all the capacity that has been assigned to all sandboxes and the sum of capacities of all the thin devices in the pool that are not managed by SPM.
3. Available Subscription Capacity: This value is the difference between the maximum and current subscribed capacities. It represents the maximum capacity that a storage administrator can further assign from the thin pool.

In the client server configuration, the SMC server may reside on a separate server from the VE server. In the local server configuration, the SMC server and the VE server may reside on the same physical server. In the virtual appliance configuration, the SMC server and the VE server may be bundled together inside a VE virtual appliance that runs inside a VM running on a VE cluster.

API authorizations that may be included to provide additional security within the storage array include:

1. a role, storage admin, which has the ability to perform operations on thin pools and storage groups;
2. authorizations set for groups;
3. authorizations set on individual thin pools and storage groups.

An authorization on a thin pool also allows the user to: create/delete a device; bind a device to an authorized thin pool; unbind a device from an authorized thin pool; reserve a thin device belonging to an authorized thin pool; and release a thin device belonging to an authorized thin pool from a reservation. Embodiments for reserving and releasing thin devices are further discussed elsewhere herein. An authorization on a storage group allows a user to put a device into a storage group or remove a device from a storage group. The above authorizations may have two functions. One is to ensure that the cloud-computing clients can only manipulate storage array storage objects on which they are authorized. The other is to provide some protection from other storage administrators to the storage array objects that the SPM 410 is using.

In an embodiment, storage provisioning commands from the cloud-computing client may come with a user id and group id. The user id may the name the user used to login to the vCenter server. The group id is the GUID of the vCenter server. In practice, it is the group id, the vCenter server GUID, that may be used to validate the provisioning command against the required permissions on the storage array (e.g., Symmetrix). For instance, if user TOM on vCenter server ABC requests a LUN be created for his VM then in order for the command to be processed successfully the Symmetrix storage administrator must have given vCenter server ABC's GUID the role of storage admin on the Symmetrix's thin pool and storage group that are going to be used for the provisioning.

Communication between the cloud-computing client and the SMC/SPM server may be done using SSL. Trust may be established between the cloud-computing client and the SMC server initially via a password. After the first login of the client to the server, using the password, the client's certificate may be stored on the SMC server. This may be used to validate any further communication with the client. VE users may be restricted by the storage viewer plug-in to performing provisioning operations on storage for VE objects to which they have access. For instance, a VE user may only create or delete an RDM for a VM on which he has VE configuration authorization.

In another embodiment, logs may be generated for SPM operations in the SMC log. These log entries include: all SPM operations that occur between the cloud-computing client and SMC client and the SMC server; all array configuration and control operations that occur during an SPM operation; and internal error conditions TABLES 1-26 describe use cases and functional details of the SPM 410 according related to functions of the storage administrator, VE administrator and the VE user according to various embodiments of the system described herein.

The following TABLES 1-15 detail example use cases and functional details of the SPM 410 related to functions of the storage administrator.

TABLE 1

Create Storage Type

| | |
|---|---|
| Use Case Name | Create a storage type |
| Description | Storage administrator creates a storage type from a previously defined Symmetrix tier definition or by a set of physical storage properties. |
| Actors | Storage admin, SA |
| Triggers | SA wants to setup a storage environment that can be managed by SPM. |

TABLE 1-continued

Create Storage Type

| | |
|---|---|
| Preconditions | 1. The SA has access to the SMC server via a browser |
| Basic Course of Events | 1. SA accesses the storage type creation dialog<br>2. SA selects a tier he wants the storage type to be created from.<br>3. SA presses the OK button. |
| Alternative Paths | 1. SA accesses the storage type creation dialog<br>2. SA enters a name for the storage type<br>3. SA enters a description for the storage type<br>4. SA selects the properties from each of several categories that define the storage type. Note that it is possible to make 0, 1, or N selections in a category.<br>   a. RAID Configuration<br>      i. RAID1<br>      ii. RAIDS 3 + 1<br>      iii. RAIDS 7 + 1<br>      iv. RAID6 6 + 2<br>      v. RAID6 14 + 2<br>   b. Disk Type<br>      i. EFD<br>      ii. FC 7200 RPM<br>      iii. FC 10,000 RPM<br>      iv. FC 15,000 RPM<br>      v. SATA<br>5. SA presses the Add button. |
| Exception Paths | 1. Storage type name already exists |
| Postconditions | 1. The new storage type is persisted. |
| Notes | 1. If FAST tiers are used to create a storage type than the tier name is used to create the storage type name.<br>2. Even if a FAST tier is used to create a storage type, once the storage type is created it is independent of the tier. Changes to the tier do not affect the storage type and the storage type itself can be updated independent of the tier.<br>3. Two different storage types can have exactly the same property set.<br>4. Storage types can be created which do not have any settings for a particular property, e.g. Disk type. In fact, a storage type can be created without any properties at all. In this case it can used to describe the storage in any thin pool. |

TABLE 2

Delete Storage Type

| | |
|---|---|
| Use Case Name | Delete storage type |
| Description | Deletes a storage type |
| Actors | Storage admin, SA |
| Triggers | The SA decides he no longer wants this storage type. |
| Preconditions | 1. The SA has access to the SMC server via a browser |
| Basic Course of Events | 1. A list of storage types is presented.<br>2. The SA selects a storage type to delete<br>3. The SA clicks OK |
| Alternative Paths | 1. NA |
| Exception Paths | 1. The storage type is still being used to describe a thin pool to sandbox association. The storage type cannot be deleted until it is not being used by any thin pool. |
| Postconditions | 1. The storage type is removed |

TABLE 3

Update Storage Type

| | |
|---|---|
| Use Case Name | Update storage type |
| Description | Updates a storage type. This includes changing its name or description. |
| Actors | Storage admin, SA |
| Triggers | The SA decides he wants to modify this storage type. |
| Preconditions | 1. The SA has access to the SMC server via a browser |
| Basic Course of Events | 1. A list of storage types is displayed.<br>2. The SA selects the storage type to update and the characteristics of the storage type are displayed:<br>   a. Name<br>   b. Description<br>2. The SA can change the name, or the description.<br>3. The SA clicks OK |
| Alternative Paths | 1. None |

TABLE 3-continued

Update Storage Type

| | |
|---|---|
| Exception Paths | 1. Updating the storage type name to one that already exists. |
| Postconditions | 1. The storage type is updated |

TABLE 4

Create Sandbox

| | |
|---|---|
| Use Case Name | Create a sandbox |
| Description | Create a sandbox that can contain thin pools. |
| Actors | Storage admin, SA |
| Triggers | The SA wants to create a new set of storage to give to VMware users for provisioning. |
| Preconditions | 1. The SA has access to the SMC server via a browser |
| Basic Course of Events | 1. SA selects create a sandbox<br>2. SA enters the name and description for the sandbox.<br>3. SA enters the Symmetrix array that holds the thin pools the sandbox will contain.<br>4. SA enters the GUID of the vSphere server instance the sandbox will contain storage for |
| Alternative Paths | 1. None |
| Exception Paths | 1. The sandbox name already exists<br>2. There is already a sandbox for this array which contains storage for the vCenter server |
| Postconditions | 1. The information about the sandbox is persisted<br>2. The sandbox appears in any vSphere client talking to the vCenter server assigned to the sandbox |
| Notes | 1. A sandbox can only contain thin pools from the same array.<br>2. The sandbox name must be unique to the SMC server instance |

TABLE 4-continued

Create Sandbox

3. More than one sandbox can be created per array, but they must be assigned to different vSphere servers
4. There is no validation of the GUID entered for the vSphere serverinstance

TABLE 5

Delete Sandbox

| | |
|---|---|
| Use Case Name | Delete a sandbox |
| Description | Delete a sandbox. |
| Actors | Storage admin, SA |
| Triggers | The SA wants to delete a sandbox so that it cannot be used byVMware users for storage provisioning. |
| Preconditions | 1. The SA has access to the SMC server via a browser |
| Basic Course of Events | 1. SA selects a sandbox from a list of sandboxes
2. SA deletes it |
| Alternative Paths | 1. None |
| Exception Paths | 1. There are still thin pools assigned to the sandbox. All the thin pools must be removed first. |
| Postconditions | 1. Sandbox is deleted along with its associated policies
2. All storage allocations for VMware resources that use this sandbox are removed. |
| Notes | 1. After deletion of the sandbox, all LUNs are left intact and still masked to the ESX servers |

TABLE 6

Update Sandbox

| | |
|---|---|
| Use Case Name | Update a sandbox |
| Description | Change some of the information about a sandbox. This includes the name, description, and vSphere server GUID. |
| Actors | Storage admin, SA |
| Triggers | The SA wants to change some of the information about a sandbox. |
| Preconditions | 1. The SA has access to the SMC server via a browser |
| Basic Course of Events | 1. SA selects a sandbox
2. The sandbox information is shown
  a. Name
  b. Description
  c. vSphere server instance the sandbox is assigned to
3. The user updates some or all of the sandbox information. |
| Alternative Paths | 1. None |
| Exception Paths | 1. The new name conflicts with the name of an already existing sandbox. |
| Postconditions | 1. Sandbox information is updated |
| Notes | 1. If the vSphere GUID is changed the sandbox's storage will no longer be available to the vSphere server with the original GUID. |

TABLE 7

Add a View to a Sandbox

| | |
|---|---|
| Use Case Name | Add a view to a sandbox |
| Description | Add a view to a sandbox |
| Actors | Storage admin, SA |
| Triggers | The SA wants to set up a sandbox to mask LUNs to a VMware cluster |
| Preconditions | 1. The SA has access to the SMC server via a browser
2. The vCenter server has authorizations on the storage group in the view to be added |
| Basic Course of Events | 1. SA selects a sandbox
2. SA selects a view to add to the sandbox. |
| Alternative Paths | 1. None |
| Exception Paths | 1. Adding a view will fail if there is already a view with the same initiator group in it.
2. Adding a view will fail if the vCenter server does not have authorizations on the storage group in the view
3. The view does not exist on the array associated with the sandbox |
| Postconditions | 1. LUNs can now be masked to the VMware cluster whose HBA ports match the WWN's in the added view's initiator group |
| Notes | 1. There can be multiple views attached to a sandbox. However, therecan only be one view per sandbox per VMware cluster.
2. A view can be attached to multiple sandboxes |

TABLE 8

Remove a View from a Sandbox

| | |
|---|---|
| Use Case Name | Remove a view from a sandbox |
| Description | Remove a view from a sandbox |
| Actors | Storage admin, SA |
| Triggers | The VMware cluster is being destroyed. |
| Preconditions | 1. The SA has access to the SMC server via a browser |
| Basic Course of Events | 1. The SA selects a sandbox
2. The SA selects a view to remove |
| Alternative Paths | 1. None |
| Exception Paths | 1. None |
| Postconditions | 1. New LUNs cannot be created for the cluster serviced by the view that was removed.
2. The view is not removed or modified, so existing LUNs are left still masked to the cluster. |

TABLE 9

Add Thin Pool to Sandbox

| | |
|---|---|
| Use Case Name | Add thin pool to a sandbox |
| Description | Add a thin pool to a sandbox. This makes all or part of the storage in the thin pool available for provisioning by VMware users. |
| Actors | Storage admin, SA |
| Triggers | The SA wants to add physical storage to a sandbox. |
| Preconditions | 1. The SA has access to the SMC server via a browser
2. The vCenter server has been given authorizations on the thin pool |
| Basic Course of Events | 1. SA selects a sandbox
2. A list of the thin pools is shown
3.
4. The SA selects the thin pool he wants to put in the sandbox. |

TABLE 9-continued

Add Thin Pool to Sandbox

| | |
|---|---|
| | 5. A list of storage types that match the thin pool is displayed. The SA selects which one he wants to use to describe the storage in the thin pool.<br>6. The available capacity of the thin pool is displayed.<br>7. SA enters the capacity he wants to use from the thin pool |
| Alternative Paths | 1. None |
| Exception Paths | 1. No storage types match the thin pool<br>2. The thin pool has no available capacity, e.g. all its capacity has been allocated to another sandbox(es).<br>3. The thin pool matches a single storage type and another thin pool has already been placed in the sandbox using that storage type.<br>4. The thin pool is not on the same array as the thin pools already in the sandbox.<br>5. The vSphere server the sandbox is assigned to does not have authorizations for this thin pool. |
| Postconditions | 1. Amount of storage of the capacity assigned from the thin pool, of the type selected for the thin pool, now appears in the virtual client. |
| Notes | 1. The sandbox can only contain thin pools from the same array.<br>2. The sandbox can only contain one thin pool of each storage type.<br>3. A thin pool can provide storage to more than one sandbox.<br>4. The amount of capacity added to a sandbox from a thin pool is subscribed capacity, not physical capacity. The total amount of subscribed capacity in a thin pool is determined by multiplying its enabled physical capacity by the maximum subscription percent (a thin pool property set by the SA) minus capacity already assigned to other thin pools and to other thin devices not in any sandboxes. |

TABLE 10

Remove Thin Pool from Sandbox

| | |
|---|---|
| Use Case Name | Remove thin pool from sandbox |
| Description | Removes a thin pool from a sandbox. This dissolves the association between the sandbox and the thin pool. It leaves any LUNs in the thin pool in place, but removes the SPM reservation on them. |
| Actors | Storage admin, SA |
| Triggers | The SA wants to remove a thin pool from a sandbox |
| Preconditions | 1. The SA has access to the SMC server via a browser |
| Basic Course of Events | 1. SA selects a sandbox<br>2. A list of the thin pools in the sandbox is shown<br>3. SA selects a thin pool to remove from the sandbox |
| Alternative Paths | 1. None |
| Exception Paths | 1. None |
| Postconditions | 1. The association between the sandbox and the thin pool is dissolved.<br>2. All the devices in the thin pool that are from the sandbox are removed from SPM control and the SPM reservation is removed.<br>3. All the storage for the storage type represented by this thin pool in the sandbox is removed. For example, if this thin pool contained the gold storage for sandbox A which is assigned to vCenter server ABC, the vSphere client will no longer have any gold storage from sandbox A on vCenter server ABC. |
| Notes | 1. Devices provisioned from the removed thin pool will not be deletedor have their masking changed. Only the SPM reservation will be removed.<br>2. Pre-creation policies for the sandbox that are for the storage type associated with the thin pool are deleted. |

TABLE 11

Update the Thin Pool Capacity in a Sandbox

| | |
|---|---|
| Use Case Name | Update the thin pool capacity in a sandbox |
| Description | Change the capacity assigned to a sandbox from a thin pool |
| Actors | Storage admin, SA |
| Triggers | The SA wants to add or remove storage to/from a sandbox for a thin pool |
| Preconditions | 1. The SA has access to the SMC server via a browser |
| Basic Course of Events | 1. SA selects a sandbox<br>2. SA selects a thin pool in a sandbox<br>3. SA enters a new capacity to assign from the thin pool to the sandbox |
| Alternative Paths | 1. None |
| Exception Paths | 1. The capacity allocated to the sandbox is reduced to below what is already being used from the thin pool.<br>2. More capacity is added than is available in the thin pool |
| Postconditions | 1. The new capacity for this type of storage appears in the vSphere client GUI |
| Notes | 1. Adding capacity to a sandbox lessens the amount of capacity that can be assigned to other sandboxes. |

TABLE 12

Adopt LUNs

| | |
|---|---|
| Use Case Name | Adopt LUNs |
| Description | A thin pool that is being added to a sandbox may already have devices in it that users want to be controlled by the SPM. This could be because the storage pool manager meta-data has been corrupted or deleted, or the user wants to bring an existing VMware configuration under SPM control. |
| Actors | Storage admin, SA |
| Triggers | The SA wants to repair a deleted or damaged SPM configuration or put an existing VMware configuration under SPM control |
| Preconditions | 1. The SA has access to the SMC server via a browser |
| Basic Course of Events | 1. The adopt LUN dialog is displayed for a sandbox<br>2. A list of the current devices in the thin pool matching the following criteria are displayed:<br>  a. Device is not reserved, or already reserved by SPM<br>  b. In a storage group, in a view, that has an initiator group that is in one of the views assigned to the sandbox<br>3. The SA selects which of the devices to adopt. |
| Alternative Paths | 1. None |

TABLE 12-continued

Adopt LUNs

| | |
|---|---|
| Exception Paths | 1. None |
| Postconditions | 1. The selected devices are adopted to be managed by SPM. They are placed in the sandbox, and their capacity is added to the sandbox's total capacity. |
| | 2. The devices are added to the SPM reservation |
| Notes | 1. A VMware user must now run refresh which determines the VM's each device is attached to and then straightens out the capacity accounting. |

TABLE 13

Adopt Existing Configuration

| | |
|---|---|
| Use Case Name | Adopt an existing VMware configuration |
| Description | SPM is being deployed in an environment where there is an existing VMware configuration that already uses storage from a Symmetrix. The existing thin pools and thin LUNs need to be brought under SPM control |
| Actors | Storage admin, SA |
| Triggers | The SA wants to bring an existing VMware environment under SPM control |
| Preconditions | 1. The SA has access to the SMC server via a browser |
| | 2. The SA has both the storage administrator and security administrator role on the Symmetrix(s) |
| Basic Course of Events | 1. SA either creates new views to use to mask new LUNs to the VMware cluster, or decides to use the existing ones. If he creates new ones, they would use the existing initiator groups that contain the WWN's for the VMware cluster. |
| | 2. If authorization is being used on the Symmetrix, then the SA enters authorizations for the vSphere server on the thin pools that contain the LUNs currently in use by the VMware cluster and for the storage groups in the views of the previous step. |
| | 3. SA either decides to use some existing storage types, or create new ones. In either case there must be one per thin pool that is going to be put into the sandbox. |
| | 4. The SA creates a sandbox as normal |
| | 5. The SA selects thin pools to add to the sandbox. These thin pools already contain the devices which are mapped to the VMware configuration. |
| | 6. The SA selects which LUNs to adopt, see the use case 0 |
| | 7. The VMUser does a refresh configuration. |
| Alternative Paths | 1. None |
| Exception Paths | 1. None |
| Postconditions | 1. The existing configuration is now under control of SPM. |
| Notes | 1. This is only supported for thin pools and thin devices |

TABLE 14

Set Client Security

| | |
|---|---|
| Use Case Name | Set Up Client Security |
| Description | Set the password that is used by vSphere clients to log into the SMC server |
| Actors | Storage admin, SA |
| Triggers | The SA is setting up the storage pool manager environment. |
| Preconditions | 1. The SA has access to the SMC server via a browser |
| Basic Course of Events | 1. SA sets the password to be used |
| Alternative Paths | 1. None |
| Exception Paths | 1. None |
| Postconditions | 1. The first time a client connects to the SMC server it must supply this password. Once the first connection is made, the password is not used. |

TABLE 14

Backup SPM Data

| | |
|---|---|
| Use Case Name | Backup SPM data |
| Description | Backup the SPM data |
| Actors | Storage admin, SA |
| Triggers | The SA wants to backup the SPM in case it gets corrupted or destroyed. |
| Preconditions | 1. The SA has access to the SMC server via a browser |
| Basic Course of Events | 1. SA selects backup data |
| | 2. A popup dialog is displayed. The SA enters a folder name to backup the SPM data to. |
| | 3. The SA clicks OK. |
| Alternative Paths | 1. None |
| Exception Paths | 1. The folder path does not exist, or the SA does not have permissions to write to the folder. |
| Postconditions | 2. The SPM meta-data is written to the folder |
| Notes | 1. The backup folder is created in the SMC directory path under . . . \WEB-INF\SPM_META_DATA |
| | 2. If the folder does not exist, then it is created. |
| | 3. If the folder does exist the old data is deleted before the new data is placed there. |

TABLE 15

Restore SPM Data

| | |
|---|---|
| Use Case Name | Restore the SPM data |
| Description | This causes the SPM data to be replaced with SPM data that had previously been saved in a backup. |
| Actors | Storage admin, SA |
| Triggers | The SA wants to restore damaged or lost SPM data. |
| Preconditions | 1. The SA has access to the SMC server via a browser |
| Basic Course of Events | 1. SA selects restore data |
| | 2. A popup dialog is displayed. The SA enters, or selects, the file which contains the previously backed up data |
| | 1. The SA clicks OK. |
| Alternative Paths | 1. None |
| Exception Paths | 1. The folder does not exist |
| Postconditions | 1. The backed up data is used to restore the SPM meta-data |
| Notes | 1. The backup folder is found in the SMC directory path under . . . \WEB-INF\SPM_META_DATA |
| | 2. If the restored SPM meta-data refers to Symmetrix objects that no longer exist, the meta data referring to those objects is removed. |
| | 3. A VMware user should run update configuration after the restore |

The following TABLES 16-21 detail example use cases and functional details of the SPM 410 related to functions of the VE administrator.

TABLE 16

Create an SPM server connection

| | |
|---|---|
| Use Case Name | Create an SPM server connection |
| Description | Registers an SPM Server with a client to perform SPM operations. |
| Actors | VMware user, VMUser |
| Triggers | The VMUser needs access to storage resources from an SPM server. |
| Preconditions | 1. Viewer plug-in is installed into the vSphere client |
| Basic Course of Events | 1. User, through the vSphere client, navigates to the EMC Storage Configuration section from the Home screen. |
| | 2. SPM Configuration section displays a list of existing SPM server connection information. |
| | 3. User select 'Add Sever'. |
| | 4. Dialog box asks the user to enter information about the new Server: IP address, SMC port #, password |
| | 5. User presses OK |

TABLE 16-continued

Create an SPM server connection

| | |
|---|---|
| Alternative Paths | 1. None |
| Exception Paths | 1. Incomplete information entered in dialog. |
| Postconditions | 1. vSphere client has access to the SPM/SMC server |
| | 2. The connection information is visible in the SPM Configuration section. |

TABLE 17

Remove an SPM server connection

| | |
|---|---|
| Use Case Name | Remove an SPM server connection |
| Description | Unregisters an SPM Server from a client. |
| Actors | VMware user, VMUser |
| Triggers | The VMUser no longer needs access to storage resources from an SPM server. |
| Preconditions | 1. Viewer plug-in is installed into the vSphere client |
| | 2. vSphere client has access to the SPM/SMC server |
| Basic Course of Events | 1. User through the vSphere client navigates to the EMC Storage Configuration section from the Home screen. |
| | 2. SPM Configuration section displays a list of existing SPM server connection information. |
| | 3. User selects a connection to remove |
| Alternative Paths | 1. None |
| Exception Paths | 1. None |
| Postconditions | 1. vSphere client has access to the SPM/SMC server has been removed |

TABLE 18

Modify an SPM server connection

| | |
|---|---|
| Use Case Name | Modify an SPM server connection |
| Description | Modify SPM Server connection settings. |
| Actors | VMware user, VMUser |
| Triggers | The VMUser needs to update connection settings for an existing SPM server. |
| Preconditions | 1. Viewer plug-in is installed into the vSphere client |
| | 2. vSphere client has access to the SPM/SMC server |
| Basic Course of Events | 1. User through the vSphere client navigates to the EMC Storage Configuration section from the Home screen. |
| | 2. SPM Configuration section displays a list of existing SPM server connection information. |
| | 3. User selects a connection to modify |
| | 4. User modifies the connection |
| Alternative Paths | 1. Modify the contents of spmsettings.xml and restart the vSphere plug-in instance. |
| Exception Paths | 1. Incomplete information entered in dialog. |
| Postconditions | 1. vSphere client has access to the SPM/SMC server has been updates to use the new information. |

TABLE 19

Allocate Storage for VMware Object

| | |
|---|---|
| Use Case Name | Allocate storage for VMware Object |
| Description | After a storage administrator assigns a sandbox to a vSphere server a VMware administrator can allocate the storage in that sandbox to VMware objects, i.e. data centers, ESX servers, clusters or resource pools. |
| Actors | VMware administrator, VMAdmin |
| Triggers | A VMAdmin needs to make some storage available for provisioning to a VMware data center, ESX server, cluster or resource pool |
| Preconditions | 1. Viewer plug-in is installed into the vSphere client |
| | 2. vSphere client has access to the SPM/SMC server |
| | 3. A sandbox has been assigned to the vSphere server that the VMAdmin has permission on |

TABLE 19-continued

Allocate Storage for VMware Object

| | |
|---|---|
| Basic Course of Events | 1. The VMAdmin selects the data center, ESX server, cluster or resource pool he wishes to allocate storage for |
| | 2. The VMAdmin is presented with the available storage, by storage type, from the parent of this VMware object. If the parent has not been explicitly allocated storage then its parent is examined, etc. all the way up to the virtual center if needed. |
| | 3. The VMAdmin enters the amount of storage he wants for each type of storage available |
| Alternative Paths | 1. None |
| Exception Paths | 1. If a clustered ESX server is selected no allocations can be made. Allocations can only be made to an ESX if it is not a member of a cluster. |
| | 2. The amount of requested allocation exceeds what is available from the parent object. |
| | 3. The amount of requested allocation is less than what is already in use at this object. |
| Postconditions | 1. The amounts of each type are now allocated to this object; data center, ESX server, cluster or resource pool. Children of this object may now only allocate storage from the amounts and types available in this object, i.e. they cannot allocate storage available from parents of this object. |

TABLE 20

Refresh Cluster Membership

| | |
|---|---|
| Use Case Name | Refresh cluster membership |
| Description | The server members of a VMware ESX cluster can change or new HBAs may be added to an ESX server. When they change, the list of server FC ports for the cluster needs to be updated. |
| Actors | VMware administrator, VMAdmin |
| Triggers | The ESX cluster server membership has been changed |
| Preconditions | 1. Viewer plug-in is installed into the vSphere client |
| | 2. vSphere client has access to the SPM/SMC server |
| Basic Course of Events | 1. The VMAdmin selects the ESX server or cluster whose membership has changed |
| | 2. The VMAdmin selects refresh cluster membership |
| Alternative Paths | 1. None |
| Exception Paths | 1. None |
| Postconditions | 1. The list of server ports recorded for that cluster is updated. When a new LUN is created for this cluster the sandbox's views will be checked to make sure there is an initiator group that matches the members of the cluster. |
| Notes | 1. This does not change the membership of any initiator groups. |

TABLE 21

Refresh Configuration

| | |
|---|---|
| Use Case Name | Refresh configuration |
| Description | Refresh configuration causes the SPM configuration data to be aligned with the VMware configuration. The SPM configuration data can become out of sync with the VMware configuration when changes are made to VMware configuration, for example creating or deleting a resource pool. |
| Actors | VMware administrator, VMAdmin |
| Triggers | The VMAdmin wants to bring the SPM data in sync with the Symmetrix and VMware configurations. |
| Preconditions | 1. Viewer plug-in is installed into the vSphere client |
| | 2. vSphere client has access to the SPM/SMC server |
| Basic Course of Events | 1. VMAdmin selects refresh on the SPM Configuration page. |
| Alternative Paths | 1. None |

TABLE 21-continued

Refresh Configuration

| | |
|---|---|
| Exception Paths | 1. None |
| Postconditions | 1. Updates the SPM server with: |
| |    a. Used and available storage for each VMware object. |
| |    b. Which LUNs are mapped to which VM's or clusters |
| |    c. Any changes to the VMware hierarchy, e.g. new resource pool added, VM migration from one resource pool to another, etc. |

The following TABLES 22-26 detail example use cases and functional details of the SPM 410 related to functions of the VE user.

TABLE 22

Create RDM for VM

| | |
|---|---|
| Use Case Name | Create RDM for VM |
| Description | Creates a thin device and maps it as an RDM for an existing VM |
| Actors | VMware user, VMUser |
| Triggers | The VMUser decides he needs to provision an RDM for his VM |
| Preconditions | 1. Viewer plug-in is installed into the vSphere client |
| | 2. vSphere client has access to the SPM/SMC server |
| | 3. Storage has been allocated to the VMware object or one of its parents that the VM is a child of |
| | 4. vCenter server has authorizations on the thin pool and storage group that will be used |
| | 5. SAN is zoned correctly |
| Basic Course of Events | 1. User through the vSphere client right clicks on the VM he desires to create the RDM for and selects 'Add Storage' |
| | 2. Dialog box asks the user to enter information about the RDM |
| | 3. The user selects the type of storage from the types available to the VM's VMware parent object |
| | 4. The user sets the size of the LUN by either selecting one of the pre-created sizes, or by entering an arbitrary size |
| |    a. If the SA has set the policy that says that only pre-created LUN sizes may be used then the user will not be able to create arbitrary sized LUNs |
| | 5. Advanced settings will optionally be made available to configure RDM options such as device modes, etc. |
| Alternative Paths | 1. None |
| Exception Paths | 1. There is not enough available capacity for the storage type selected |
| | 2. Creating the LUN violates one of the provisioning policies put in place on the sandbox by the SA, e.g. maximum number of LUNs |
| Postconditions | 1. If the size selected was a pre-created size and if there is an existing, free, thin device, then it is used, otherwise a new thin device is created |
| | 2. The thin device is added to the storage group for that thin pool/cluster combination. |
| | 3. The thin device is discovered by the servers in the cluster |
| | 4. An RDM for the VM is created from the thin device |
| | 5. Capacities for the VMware objects are updated |

TABLE 23

Remove RDM from VM

| | |
|---|---|
| Use Case Name | Remove RDM from VM |
| Description | Un-maps an RDM from a VM and deletes the LUN |
| Actors | VMware user, VMUser |
| Triggers | The VMUser decides he no longer needs the RDM mapped to a VM. |

TABLE 23-continued

Remove RDM from VM

| | |
|---|---|
| Preconditions | 1. Viewer plug-in is installed into the vSphere client |
| | 2. vSphere client has access to the SPM/SMC server |
| | 3. An RDM has been mapped to a VM. |
| | 4. vCenter server has authorizations on the thin pool and storage group that will be used |
| Basic Course of Events | 1. User is presented with a list of existing RDMs on a VM's 'EMC Storage' tab. |
| | 2. User right clicks an RDM and chooses to remove the RDM. |
| | 3. If the device is an SPM device, the user will be asked if they wish to destroy the device and return storage to the pool or leave the device mapped to the cluster. |
| Alternative Paths | 1. None |
| Exception Paths | 1. None |
| Postconditions | 1. If the device was a non-SPM device, the RDM is removed and the device is still presented to the cluster. |
| | 2. The RDM will be removed from the VM, and depending on the answer to Event 3, will still be presented to the cluster or be deleted. |
| | 3. If the LUN is to be deleted, the capacity of the LUN is checked against the pre-creation policies for the sandbox. |
| |    a. If the capacity does not match any of the policies the device is deleted |
| |    b. If the capacity matches a policy the device storage is reclaimed and the device is kept for a future LUN creation of that size |
| | 4. Capacities for the VMware objects are updated |

TABLE 24

Create VMFS Datastore for a Cluster

| | |
|---|---|
| Use Case Name | Create a VMFS Datastore for a cluster |
| Description | Creates a thin device and formats it as a VMFS Datastore |
| Actors | VMware user, VMUser |
| Triggers | The VMUser decides he needs a new VMFS Datastore for his cluster |
| Preconditions | 1. The SPM license has been installed on the SMC server |
| | 2. Viewer plug-in is installed into the vSphere client |
| | 3. vSphere client has access to the SPM/SMC server |
| | 4. Storage has been allocated to the VMware object or one of its parents |
| | 5. vCenter server has authorizations on the thin pool and storage group that will be used |
| | 6. SAN is zoned correctly |
| Basic Course of Events | 1. User through the vSphere client right clicks on the ESX server or cluster he desires to create a VMFS Datastore for |
| | 2. Dialog box asks the user to enter information about the VMFS Datastore |
| | 3. The user selects the type of storage from the types available to the cluster |
| | 4. The user sets the size of the LUN by either selecting one of the pre-created sizes, or by entering an arbitrary size |
| |    a. If the SA has set the policy that says that only pre-created LUN sizes may be used then the user will not be able to create arbitrary sized LUNs |
| Alternative Paths | 1. None |
| Exception Paths | 1. There is not enough available capacity for the storage type selected |
| Postconditions | 1. If the size selected was a pre-created size then an existing, free, thin device is used, otherwise a new thin device is created |
| | 2. The thin device is added to the storage group for that thin pool/cluster combination. |
| | 3. The thin device is discovered by the servers in the cluster |

TABLE 24-continued

Create VMFS Datastore for a Cluster

4. The LUN/thin device is formatted as a VMFS data store
5. Capacities for the VMware objects are updated

TABLE 25

Delete VMFS Datastore from a Cluster

| | |
|---|---|
| Use Case Name | Delete a VMFS Datastore from a cluster |
| Description | Deletes the device(s) backing a VMFS Datastore |
| Actors | VMware user, VMUser |
| Triggers | The VMUser decides he needs a new VMFS Datastore for his cluster |
| Preconditions | 1. The SPM license has been installed on the SMC server<br>2. Viewer plug-in is installed into the vSphere client<br>3. vSphere client has access to the SPM/SMC server<br>4. Storage has been allocated to the VMware object or one of its parents<br>5. A VMFS Datastore is mapped to a cluster.<br>6. vCenter server has authorizations on the thin pool and storage group that will be used |
| Basic Course of Events | 1. User right-clicks on a Datastore and from the 'EMC Storage' menu and selects delete Datastore.<br>2. If the device is an SPM device, the user will be asked if they wish to destroy the backing device(s) and return storage to the pool or leave the device mapped to the cluster. |
| Alternative Paths | 1. None |
| Exception Paths | 1. The Datastore does not contain a SPM device(s). |
| Postconditions | 1. The Datastore will be removed from the cluster, and depending on the answer to Event 2, will still be presented to the cluster or be deleted.<br>2. If the LUN is to be deleted, the capacity of the LUN is checked against the pre-creation policies for the sandbox.<br>   a. If the capacity does not match any of the policies the device is deleted<br>   b. If the capacity matches a policy the device storage is reclaimed and the device is kept for a future LUN creation of that size<br>3. Capacities for the VMware objects are updated |

TABLE 26

Extend VMFS Datastore

| | |
|---|---|
| Use Case Name | Extend a VMFS Datastore |
| Description | Extend a VMFS Datastore. This use case is only valid for VMFS data stores composed of SPM LUNs. |
| Actors | VMware user, VMUser |
| Triggers | The VMUser decides he needs to extend and existing VMFS Datastore for his cluster. |
| Preconditions | 1. Viewer plug-in is installed into the vSphere client<br>2. vSphere client has access to the SPM/SMC server<br>3. Storage has been allocated to the VMware object or one of its parents<br>4. A VMFS Datastore is mapped to a cluster.<br>5. vCenter server has authorizations on the thin pool and storage group that will be used |
| Basic Course of Events | 1. User right-clicks on a Datastore and from the 'EMC Storage' menu and selects extend Datastore.<br>2. If the Datastore is backed by an SPM device, a dialog asks the user for the new, larger capacity. |
| Alternative Paths | 1. None |
| Exception Paths | 1. None |
| Postconditions | 1. The Datastore will display a larger capacity in the VMware GUI.<br>2. A new device will be provisioned and appended to the Datastore as a new extent.<br>3. Capacities for the VMware objects are updated |

TABLE 26-continued

Extend VMFS Datastore

| | |
|---|---|
| Notes | 1. VMware's LUN concatenation facility will be used to extend the Datastore as opposed to any array facility |

According to the system described herein, the SPM 410 pushes the provisioning of storage from a storage administrator out to virtualization users and administrators. By decentralizing storage administration, storage provisioning is made as dynamic as server provisioning in a virtualization environment. Use of the SPM 410 enables virtualization users to select storage for provisioning based on a request that includes selection of a type of storage and an amount without having to be knowledgeable about storage provisioning operations. The details of creating the storage and performing masking operations to the servers are done automatically. Further, using a virtual container (i.e. sandbox), the storage administrator is able to control the storage that is accessible to virtualization users for provisioning and is able to set boundaries and policies around what storage the virtualization users can provision from. Additionally, using the SPM 410, the virtualization administrator is allowed to sub-divide the storage made accessible from the storage administrator using a virtualization hierarchy like that provided for CPU and memory resources.

In other embodiments, the system described herein may be used in connection with end user provisioning of storage for various types of virtualization environments, such as enabled by VMware and/or Hyper-V, for example. The storage arrays used in connection with the system described herein may include arrays produced by EMC Corporation of Hopkinton, Mass., including Symmetrix and Clariion, as well as other appropriate types of storage arrays. The system described herein may be used in connection with storage tiering, as further discussed elsewhere herein, including FAST tiers, and storage types may be defined in terms of FAST tier policies and FAST SLA's rather than just in terms of physical storage characteristics. Suitable storage pools that may be used with the system described herein may include thin pools, thick pools, FAST pools and/or other appropriate kinds of storage pools.

Various of the embodiments discussed herein may be combined with each other in appropriate combinations in connection with the system described herein. Additionally, in some instances, the order of steps in the flowcharts may be modified, where appropriate. Further, the system described herein may be implemented using software, hardware, and/or a combination of software and hardware. Software implementations of the system described herein may include executable code that is stored in a computer readable medium and executed by one or more processors. The computer readable medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory storage medium or computer memory on which executable code may be stored and executed by a processor. The system described herein may be used in connection with any appropriate operating system. Further, any appropriate servers/routers may be used. Some or all of the routers may be replaced with other devices and/or some or all of the services provided by the routers may be provided by some or all of the servers.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for managing storage in a virtualization environment, comprising:
    identifying a storage pool having at least a first storage type in a storage array;
    providing a storage pool manager that manages provisioning of storage corresponding to the storage pool according to a request; and
    controlling access to the storage corresponding to the storage pool, wherein access to the storage corresponding to the storage pool is controlled using a virtual container which is administrated separately from the provisioning of the storage and wherein a storage administrator assigns the storage corresponding to the storage pool to the virtual container, and wherein a virtualization entity, that is an entity separate from the storage administrator, provisions storage according to the request from the virtual container.

2. The method according to claim 1, wherein the request corresponds to provisioning of at least one virtual machine and includes a requested storage type and an amount of requested storage.

3. The method according to claim 1, wherein the virtual container includes the storage corresponding to the storage pool, and wherein the virtual container is assigned to a virtual center used in connection with the provisioning of the storage.

4. The method according to claim 1, wherein the provisioning of the storage according to the request is performed using the storage pool manager that is accessed by a user via a user interface.

5. The method according to claim 4, wherein the user interface is provided using a plug-in.

6. The method according to claim 1, wherein the storage pool is a thin pool.

7. A non-transitory computer readable medium storing software for managing storage in a virtualization environment, the software comprising:
    executable code that identifies a storage pool having at least a first storage type in a storage array;
    executable code that provides a storage pool manager that manages provisioning of storage corresponding to the storage pool according to a request;
    executable code that controls access to the storage corresponding to the storage pool, wherein access to the storage corresponding to the storage pool is controlled using a virtual container which is administrated separately from the provisioning of the storage;
    executable code that enables a storage administrator to assign the storage corresponding to the storage pool to the virtual container; and
    executable code that enables a virtualization entity, that is an entity separate from the storage administrator, to provision storage according to the request from the virtual container.

8. The non-transitory computer readable medium according to claim 7, wherein the request corresponds to provisioning of at least one virtual machine and includes a requested storage type and an amount of requested storage.

9. The non-transitory computer readable medium according to claim 7, wherein the virtual container includes the storage corresponding to the storage pool, and wherein the virtual container is assigned to a virtual center used in connection with the provisioning of the storage.

10. The non-transitory computer readable medium according to claim 7, wherein the provisioning of the storage according to the request is performed using the storage pool manager that is accessed by a user via a user interface.

11. The non-transitory computer readable medium according to claim 7, wherein the user interface is provided using a plug-in.

12. The non-transitory computer readable medium according to claim 7, wherein the storage pool is a thin pool.

13. A storage system comprising:
    a storage array;
    at least one storage server coupled to the storage array; and
    at least one server providing functions of a storage pool manager, wherein the functions of the storage pool manager include:
        identifying a storage pool having at least a first storage type in the storage array;
        providing a storage pool manager that manages provisioning of storage corresponding to the storage pool according to a request; and
        controlling access to the storage corresponding to the storage pool, wherein access to the storage corresponding to the storage pool is controlled using a virtual container which is administrated separately from the provisioning of the storage and wherein a storage administrator assigns the storage corresponding to the storage pool to the virtual container, and wherein a virtualization entity, that is an entity separate from the storage administrator, provisions storage according to the request from the virtual container.

14. The storage system according to claim 13, wherein the request corresponds to provisioning of at least one virtual machine and includes a requested storage type and an amount of requested storage.

15. The storage system according to claim 13, wherein the virtual container includes the storage corresponding to the storage pool, and wherein the virtual container is assigned to a virtual center used in connection with the provisioning of the storage.

16. The storage system according to claim 13, wherein the provisioning of the storage according to the request is performed using the storage pool manager that is accessed by a user via a user interface.

17. The storage system according to claim 13, wherein the storage pool is a thin pool.

* * * * *